(12) United States Patent
Tsujii

(10) Patent No.: US 6,792,153 B1
(45) Date of Patent: Sep. 14, 2004

(54) IMAGE PROCESSING METHOD AND APPARATUS, AND STORAGE MEDIUM

(75) Inventor: Osamu Tsujii, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 708 days.

(21) Appl. No.: 09/708,482

(22) Filed: Nov. 9, 2000

(30) Foreign Application Priority Data

Nov. 11, 1999 (JP) ............................................. 11-321210
Nov. 11, 1999 (JP) ............................................. 11-321211

(51) Int. Cl.⁷ ................................................. G06K 9/36
(52) U.S. Cl. ..................................................... 382/239
(58) Field of Search .......................... 382/128, 13, 232, 382/234–236, 238–240, 244–251, 305, 306; 707/1, 7, 104.1, 204

(56) References Cited

U.S. PATENT DOCUMENTS

| | | | |
|---|---|---|---|
| 4,258,264 A | | 3/1981 | Kotera et al. |
| 5,019,975 A | * | 5/1991 | Mukai ........................... 707/7 |
| 5,490,221 A | * | 2/1996 | Ransford et al. ............ 382/130 |
| 5,502,778 A | * | 3/1996 | Ishikawa et al. ............. 382/239 |
| 5,884,005 A | * | 3/1999 | Peters ........................... 386/109 |
| 6,147,976 A | * | 11/2000 | Shand et al. ................. 370/254 |
| 6,643,405 B1 | * | 11/2003 | Sako ........................... 382/239 |

FOREIGN PATENT DOCUMENTS

| | | |
|---|---|---|
| JP | 55-12429 | 1/1980 |
| JP | 56-11395 | 2/1981 |

* cited by examiner

Primary Examiner—Jose L. Couso
(74) Attorney, Agent, or Firm—Fitzpatrick, Cella, Harper & Scinto

(57) ABSTRACT

Compressed image data is input, and it is checked according to the attributes of that image if the compression ratio of the compressed image is to be changed by a compression ratio determination unit. A compression ratio change unit changes the compression ratio of the compressed image to increase by deleting a high-frequency subband or lower bit plane of the compressed image data. Upon changing the compression ratio, codes of a non-region-of-interest of that image data are deleted, and if a desired compression ratio cannot be obtained by only such deletion, codes of a region of interest of that data are deleted to change the compression ratio.

42 Claims, 24 Drawing Sheets

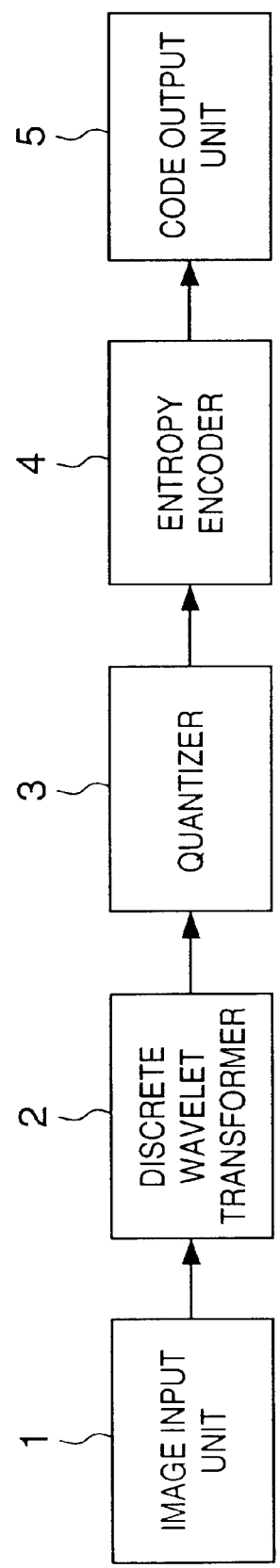

FIG. 5A

| MH | TH0 | BS0 | TH1 | BS1 | ...... | THn-1 | BSn-1 |

FIG. 5B

| IMAGE SIZE | TILE SIZE | NUMBER OF COMPONENTS | COMPONENT INFORMATION |

FIG. 5C

| TILE LENGTH | ENCODING PARAMETER |

FIG. 5D

| HL2 | LH2 | LL | ---- | LL | HL2 | LH2 | HH2 | LH2 | HL1 | LH1 | HH1 |

BIT PLANE S-1 | BIT PLANE S-2 | BIT PLANE 0

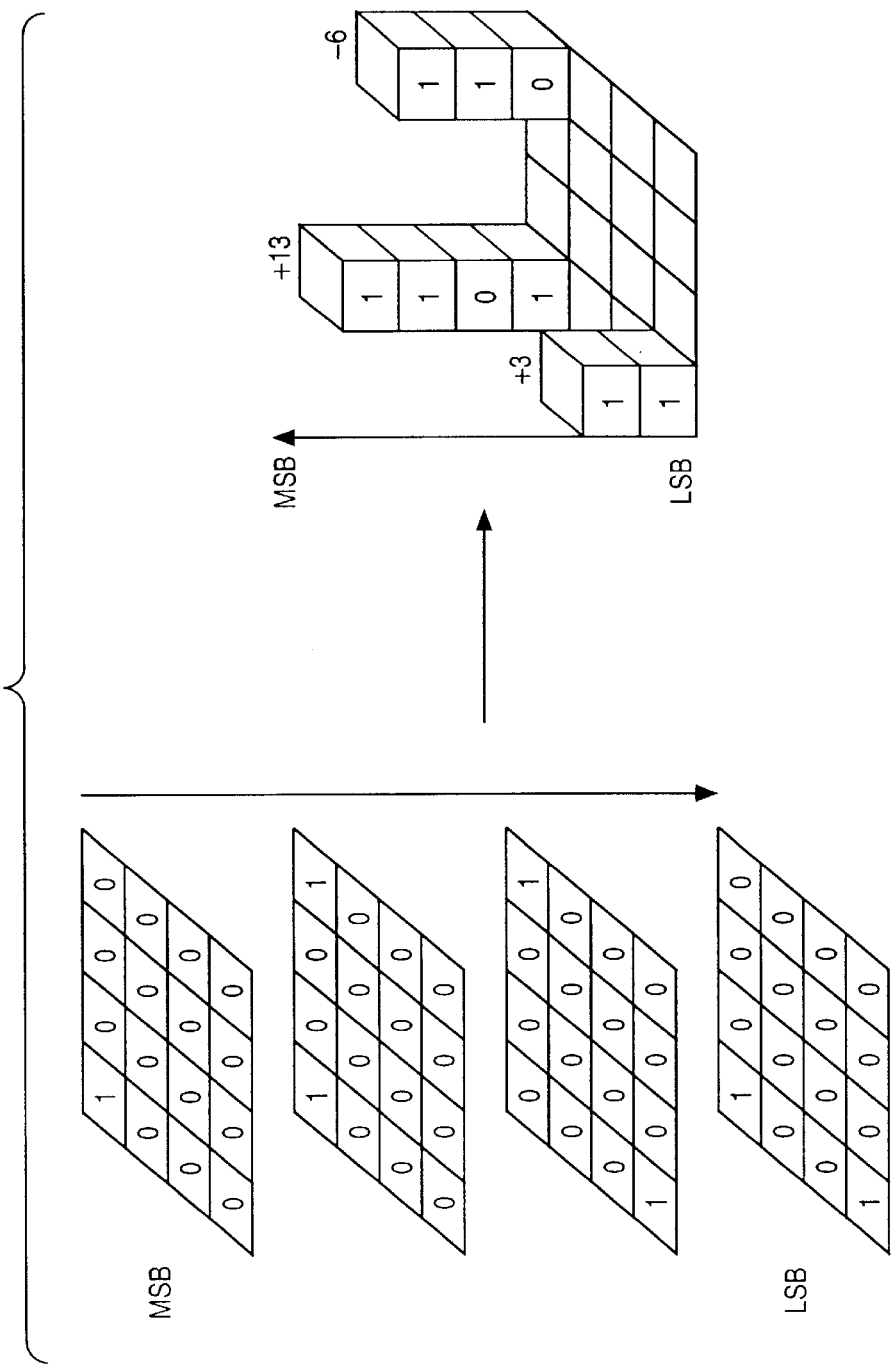

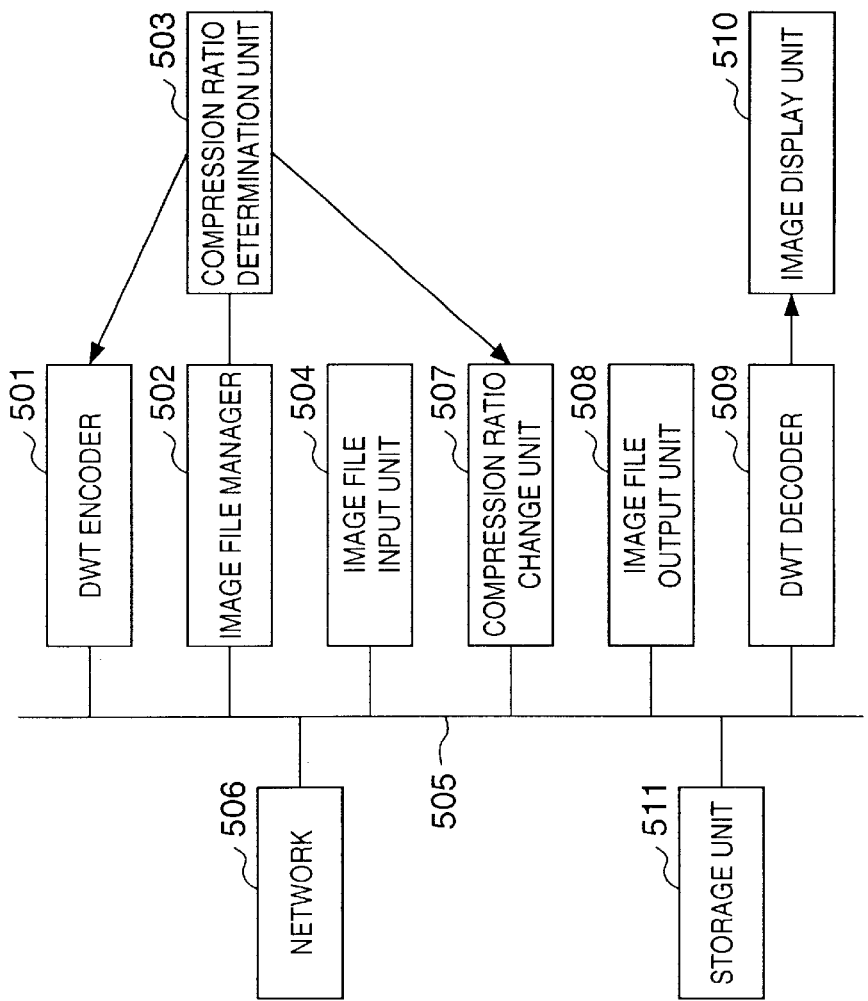

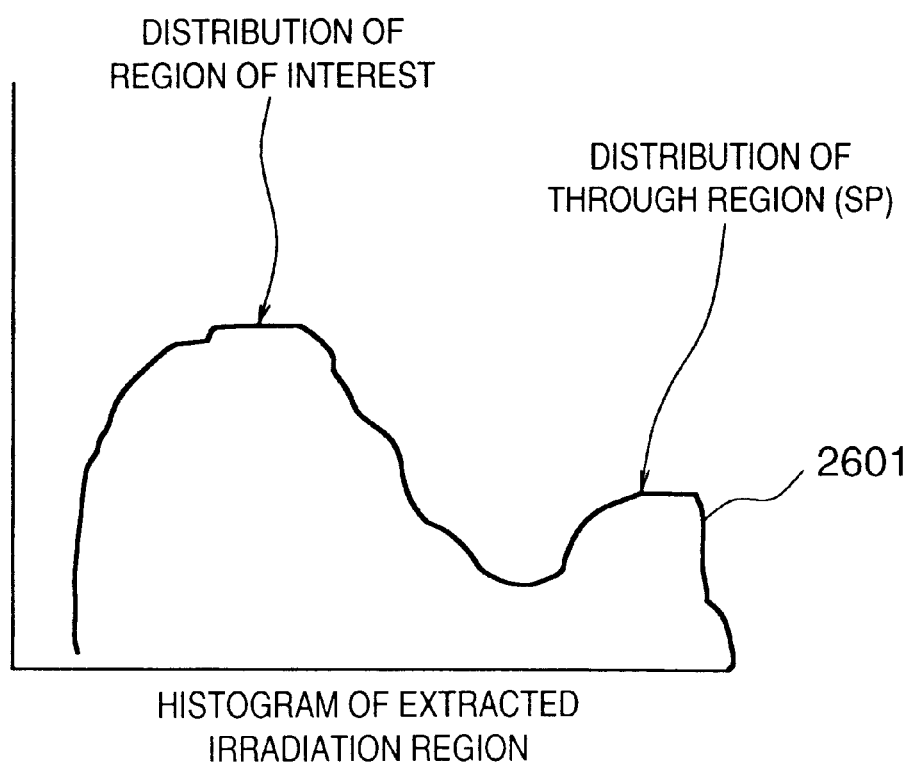

FIG. 18A
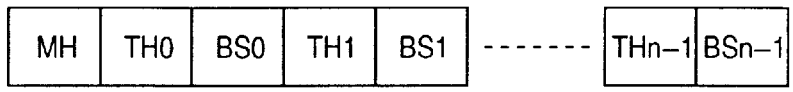
FIG. 18B
| IMAGE SIZE | TILE SIZE | NUMBER OF COMPONENTS | COMPONENT INFORMATION |
|---|---|---|---|
FIG. 18C
| TILE LENGTH | ENCODING PARAMETER | MASK INFORMATION | BIT SHIFT AMOUNT |
|---|---|---|---|
FIG. 18D
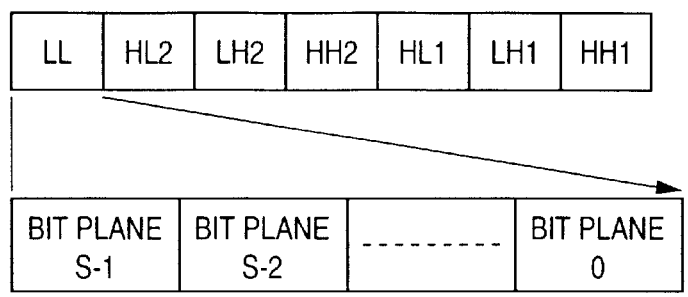

FIG. 19A

| MH | TH0 | BS0 | TH1 | BS1 | ...... | THn-1 | BSn-1 |

FIG. 19B

| IMAGE SIZE | TILE SIZE | NUMBER OF COMPONENTS | COMPONENT INFORMATION |

FIG. 19C

| TILE LENGTH | ENCODING PARAMETER | MASK INFORMATION | BIT SHIFT AMOUNT |

FIG. 19D

| LL | LH2 | HL2 | LL | ...... | LL | HL2 | LH2 | HH2 | HL1 | LH1 | HH1 |

BIT PLANE S-1 | BIT PLANE S-2 | BIT PLANE 0

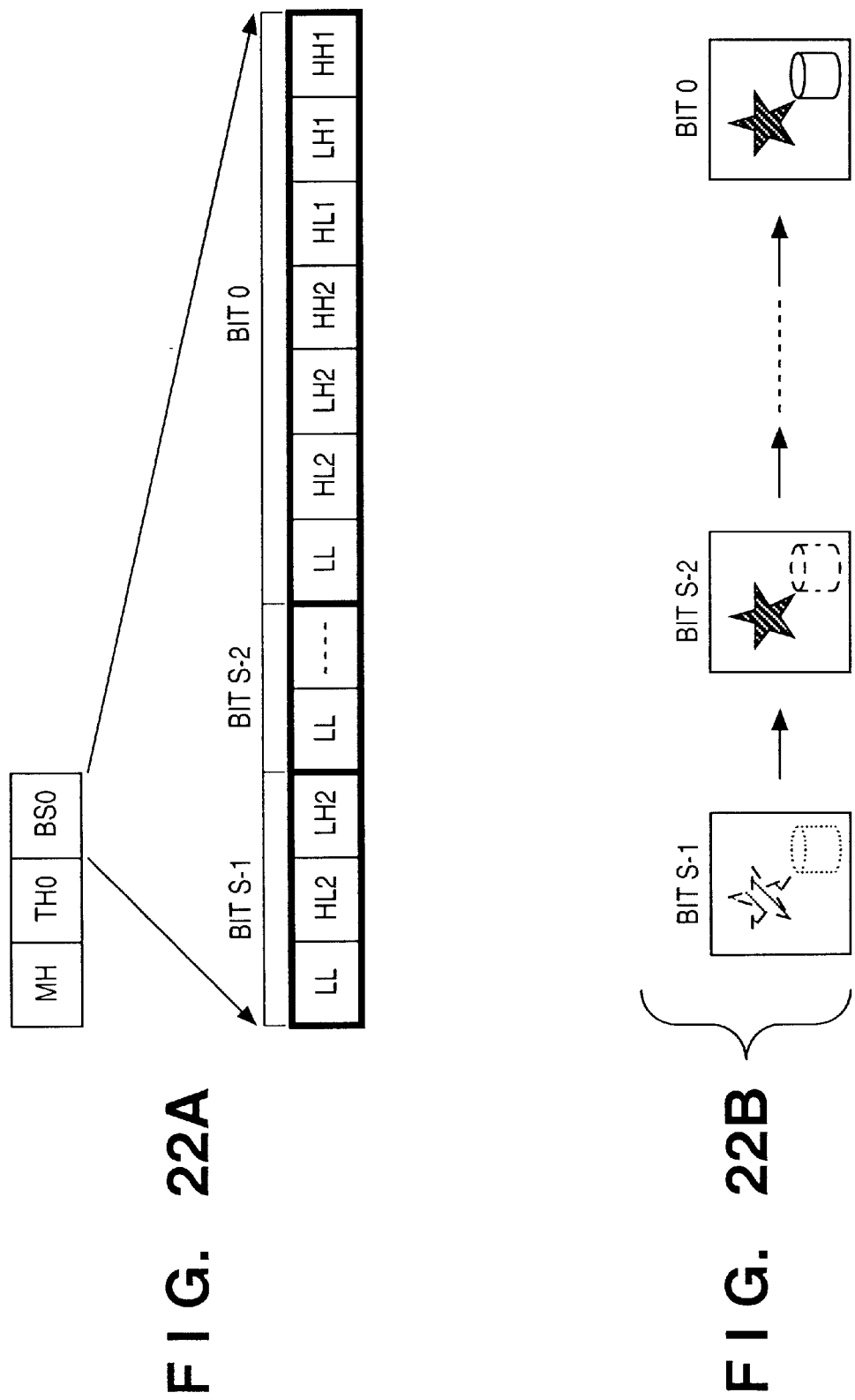
F I G. 22A
F I G. 22B

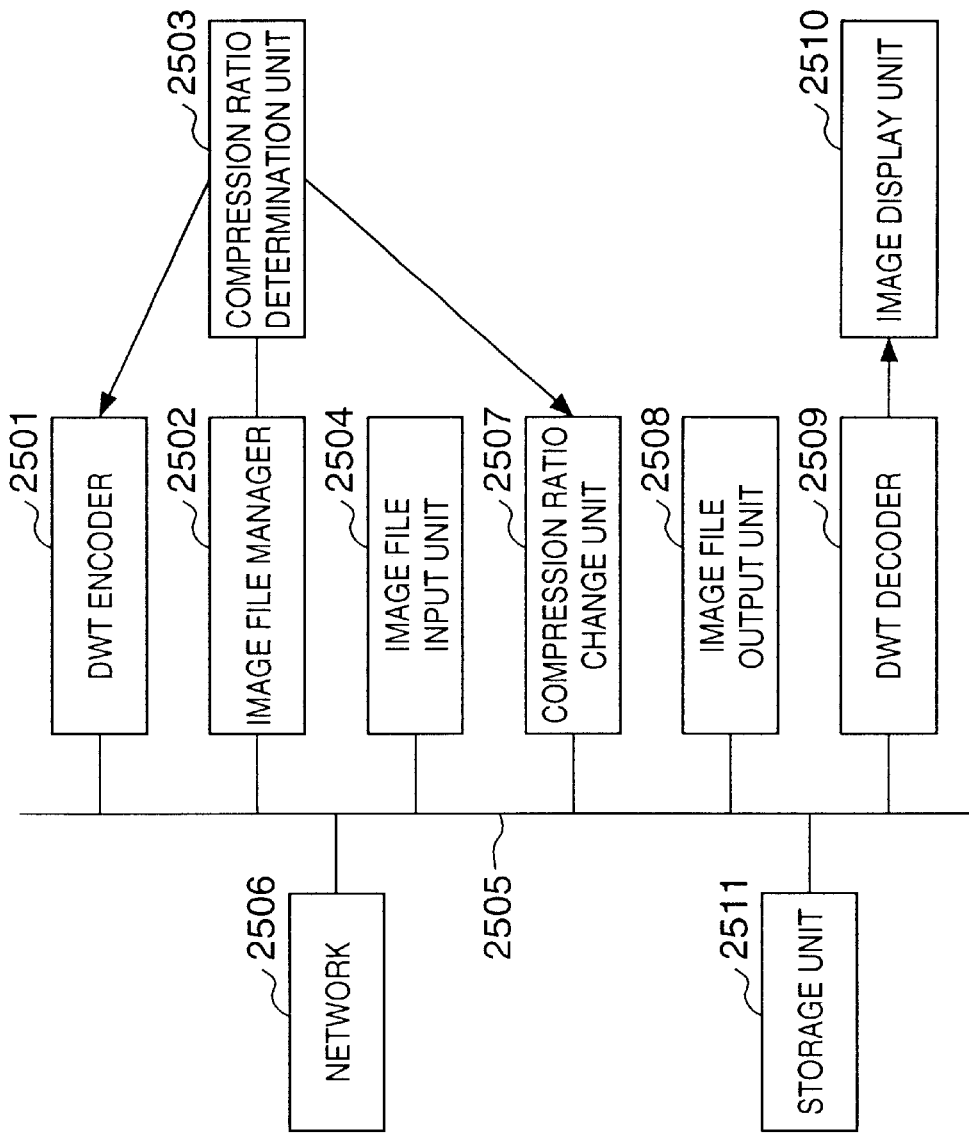

IMAGE PROCESSING METHOD AND APPARATUS, AND STORAGE MEDIUM

FIELD OF THE INVENTION

The present invention relates to an image processing method and apparatus for changing the compression ratio of compressed image data, and a storage medium.

BACKGROUND OF THE INVENTION

When a given type of phosphor is irradiated with radiation (X-rays, $\alpha$-rays, $\beta$-rays, $\gamma$-rays, electron beam, ultraviolet rays, or the like), it partially stores radiation energy. When that phosphor is irradiated with excitation light such as visible light or the like, it emits light by stimulation in accordance with the stored energy. The phosphor that exhibits such nature is called a storage phosphor (photostimulable phosphor). The present applicant has already proposed a radiation image information recording/reproduction system (Japanese Patent Laid-Open Nos. 5-12429, 56-11395, and the like). In this system, using such storage phosphor, radiation image information of an object to be sensed such as a human body or the like is temporarily recorded on a storage phosphor sheet, and the storage phosphor sheet is scanned while being irradiated with excitation light such as a laser beam or the like, so as to emit light by stimulation. The emitted light is photoelectrically read to obtain an image signal, and a radiation image of the object is output as a visible image to a recording medium such as a photosensitive material or to a display device such as a CRT or the like on the basis of the image signal.

Also, a system which senses an X-ray image of an object by light emitted by stimulation using a semiconductor sensor in the same manner as in the above system has been developed in recent years. Such system has a practical merit, i.e., it can record an image over a very broader radiation exposure range than a radiation photographic system using conventional silver halide photographs. That is, X-rays over a very broad range is read by a photoelectric conversion means to be converted into an electrical signal, and a visible image based on a radiation image is output to a recording medium such as a photosensitive material or to a display device such as a CRT or the like using the electrical signal, thus obtaining a radiation image which is free from any variations of the dose of radiation.

Since such X-ray image contains a very large amount of information, storage or transmission of that image information requires a huge information volume. For this reason, storage and transmission of such image information use high-efficiency coding that reduces the data size by removing redundancy of an image or changing the contents of an image to a degree at which deterioration of image quality is not visually recognizable.

For example, JPEG recommended by ISO and ITU-T as an international standard coding scheme of still image uses DPCM for reversible compression, and discrete cosine transformation (DCT) for irreversible compression. A detailed description of JPEG will be omitted since they are described in ITU-T Recommendation T.81|ISO/IEC 10918-1 and the like.

In recent years, many studies about compression methods using discrete wavelet transformation (DWT) have been made. One feature of the compression method using DWT is that it is free from any blocking artifact which is observed in DCT.

Radiation images such as X-ray images, CT images, and MRI images prevalently used in the medical field must be held around five years by law, but hospitals hold such images over 10 years under their self-imposed control. These images are compressed at a predetermined compression ratio upon storage, but it is desirable to change the compression ratio in correspondence with the importance levels of images upon storage in terms of the storage capacity. For example, a low compression ratio is used for relatively new image data or image data which is frequently referred to, and a high compression ratio is used for old image data or image data which is rarely referred to, so as to reduce the image data size stored. However, it is not easy to change the compression ratio of image data due to huge computation volume. Also, it is required to hold image data at higher compression ratio as the image data size to be held increases.

SUMMARY OF THE INVENTION

The present invention has been made in consideration of the above prior arts, and has as its object to provide an image processing method and apparatus, which can easily obtain an image compressed at a higher compression ratio using compressed image data that has already been compressed and stored when the compression ratio of that image is changed to increase, and a storage medium.

It is another object of the present invention to provide an image processing method and apparatus which can update image files by changing the compression ratios of images in correspondence with their importance levels, and a storage medium.

It is still another object of the present invention to provide an image processing method and apparatus which can obtain image data compressed at a desired compression ratio by easily changing the compression ratio of encoded image data, and a storage medium.

It is still another object of the present invention to provide an image processing method and apparatus which can change the compression ratio of image data to a desired value by removing codes of a non-region-of-interest or a non-region-of-interest and a region of interest in units of subbands or bit planes as a feature of codes of DWT, and a storage medium.

It is still another object of the present invention to provide an image processing method and apparatus which can encode a region of interest with high image quality at a low compression ratio by preferentially removing codes of a non-region-of-interest of an image.

In order to attain the above described objects, an image processing apparatus of the present invention comprises input means for inputting compressed image data; compression ratio setting means for setting a compression ratio of the compressed image data in accordance with a time factor; and compression ratio change means for changing the compression ratio of the image data transformed by said transformation means to a compression ratio set by said compression ratio setting means.

In an aspect of the invention, the compresses image data is compressed by using a discrete wavelet transformation;

In order to attain the above described objects, an image processing apparatus of the present invention, comprises input means for inputting an image file including compressed image data; and compression ratio change means for changing a compression ratio of the image data input by said input means by deleting a code of a non-region-of-interest in the image data.

In order to attain the above described objects, an image processing apparatus of the present invention, comprises input means for inputting an image file including compressed image data; first compression ratio change means for changing a compression ratio of the image data input by said input means by deleting a code of a non-region-of-interest in the image data; and second compression ratio change means for changing the compression ratio of the image data input by said input means by deleting a code of a region of interest in the image data.

In order to attain the above described objects, an image processing method of the present invention, comprises an input step of inputting compressed image data; a compression ratio setting step of setting a compression ratio of the compressed image data in accordance with a time factor; and a compression ratio change step of changing the compression ratio of the image data transformed in said transformation step to a compression ratio set in said compression ratio setting step.

In an aspect of the present invention, the compression ratio can be set on the basis of at least one of a type of image, a sensed portion and an outpatient service history of a patient corresponding to the image data.

In another aspect of the present invention, the time factor includes at least one of the number of days elapsed after an image sensing date, the number of days elapsed after a diagnosis date based on the image, and the number of days elapsed after a last access date to the image.

In order to attain the above described objects, an image processing method of the present invention, comprises an input step of inputting an image file including compressed image data; and a compression ratio change step of changing a compression ratio of the image data input in said input step by deleting a code of a non-region-of-interest in the image data.

In order to attain the above described objects, an image processing method of the present invention, comprises an input step of inputting an image file including compressed image data; a first compression ratio change step of changing a compression ratio of the image data input in said input step by deleting a code of a non-region-of-interest in the image data; and a second compression ratio change step of changing the compression ratio of the image data input in said input step by deleting a code of a region of interest in the image data.

Other features and advantages of the present invention will be apparent form the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 1 is a block diagram showing the arrangement of an image encoding apparatus according to the first embodiment of the present invention;

FIGS. 5A to 5D are schematic views for explaining the format of a code sequence to be generated and output in case of SNR scalability;

FIG. 7 is a view for explaining the bit planes and the decoding order in units of bit planes of an entropy decoder in the first embodiment;

FIG. 11 is a block diagram showing the functional arrangement of an image processing apparatus according to the first embodiment of the present invention;

FIG. 17 is a view for explaining an example of the region of interest extracted from the irradiated region of an X-ray image according to the second embodiment;

FIGS. 18A to 18D are schematic views showing the format of a code sequence to be generated and output by spatial scalability in the second embodiment;

FIGS. 19A to 19D are schematic views for explaining the format of a code sequence to be generated and output in case of SNR scalability in the second embodiment;

FIGS. 22A and 22B are views for explaining an example of a code sequence in case of SNR scalability according to the second embodiment and its decoding process;

FIG. 23 is a block diagram showing the functional arrangement of an image processing apparatus according to the second embodiment of the present invention.

DESCRIPTION OF THE PREFERRED EMBODIMENTS

Figure 2A:
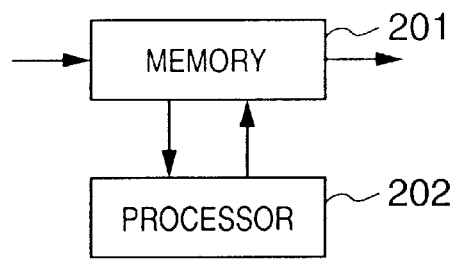
FIGS. 2A to 2C are views for explaining the arrangement of a wavelet transformer according to the first embodiment, and subbands obtained by transformation.

Preferred embodiments of the present invention will be described in detail hereinafter with reference to the accompanying drawings.

FIG. 1 is a block diagram showing the arrangement of an image encoding apparatus according to the first embodiment of the present invention.

Referring to FIG. 1, reference numeral 1 denotes an image input unit for inputting image data. The image input unit 1 comprises an image sensing device such as a scanner, digital camera, or the like for scanning a document image, an interface unit having an interface function with a communication line, or the like. Reference numeral 2 denotes a discrete wavelet transformer for computing the two-dimensional discrete wavelet transform of the input image. Reference numeral 3 denotes a quantizer for quantizing coefficients obtained by discrete wavelet transformation of the discrete wavelet transformer 2. Reference numeral 4 denotes an entropy encoder for entropy-encoding the coefficients quantized by the quantizer 3. Reference numeral 5 denotes a code output unit for outputting codes encoded by the entropy encoder 4. Reference numeral 11 denotes a region designation unit for designating the region of interest of an image input from the image input unit 1. Note that a film scanner, X-ray digital image sensing apparatus, X-ray CT, MRI, ultrasonic diagnosis apparatus, and the like may be used as the image input unit 1 in the field of, e.g., medical equipment.

Note that the apparatus according to the first embodiment is not limited to a dedicated apparatus shown in FIG. 1, and the present invention can be applied to, e.g., a case wherein a versatile PC or workstation loads a program to implement the aforementioned functions.

In the above arrangement, the image input unit 1 inputs pixel signals that form an image to be encoded in the raster scan order, and its output is input to the discrete wavelet transformer 2. In the following description, an image signal input from the image input unit 1 is expressed by a monochrome multi-valued image. However, upon encoding a plurality of color components of a color image or the like, each of R, G, and B color components or luminance and chromaticity components can be compressed as the monochrome component.

The discrete wavelet transformer 2 executes a two-dimensional wavelet transformation process for the input image signal, and computes and outputs transform coefficients.

Figure 2B:
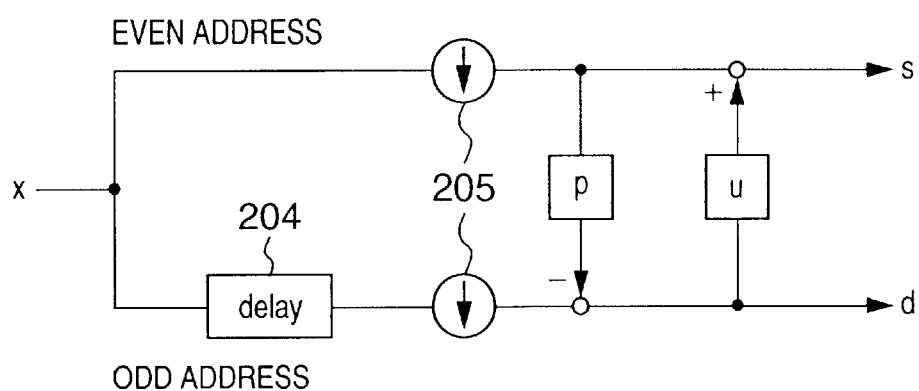
Figure 2C:
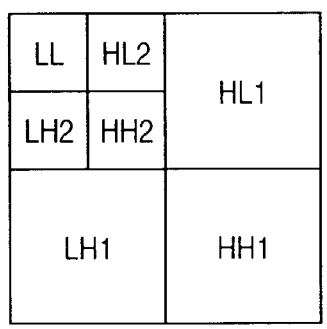

FIGS. 2A to 2C are views for explaining the basic arrangement and operation of the discrete wavelet transformer 2 according to this embodiment.

An image signal input from the image input unit 1 is stored in a memory 201, is sequentially read out by a processor 202 to undergo the discrete wavelet transformation process, and is stored in the memory 201 again.

FIG. 2B is a block diagram showing the arrangement of the process in the processor 202. Referring to FIG. 2B, the input image signal is separated into odd and even address signals by a combination of a delay element 204 and down samplers 205, and these signals undergo filter processes of two filters p and u. In FIG. 2B, s and d represent low- and high-pass coefficients upon breaking up a linear image signal to one level, and are respectively computed by:

$$d(n)=x(2n+1)-\text{floor}((x(2n)+x(2n+2))/2) \tag{1}$$

$$s(n)=x(2n)+\text{floor}((d(n-1)+d(n))/4) \tag{2}$$

where x(n) is an image signal to be transformed, and floor(x) is a function of outputting a maximum integer smaller than x.

With this process, the linear discrete wavelet transformation process is done for an image signal from the image input unit 1. Since two-dimensional discrete wavelet transformation is implemented by sequentially executing linear discrete wavelet transformation in the horizontal and vertical directions of an image and its details are known to those who are skilled in the art, a description thereof will be omitted.

FIG. 2C shows an example of the format of two levels of transformation coefficient groups obtained by the two-dimensional discrete wavelet transformation process. An image signal is broken up into coefficient sequences HH1, HL1, LH1, HL2 ..., LL in different frequency bands. Note that these coefficient sequences will be referred to as subbands hereinafter. The coefficients of the individual subbands are output to the quantizer 3.

The quantizer 3 quantizes the input coefficients by a predetermined quantization step, and outputs indices corresponding to the quantized values. In this case, quantization is described by:

$$q=\text{sign}(c)\,\text{floor}(\text{abs}(c)/\Delta) \tag{3}$$

$$\text{sign}(c)=1;\ c\geq 0 \tag{4}$$

$$\text{sign}(c)=-1;\ c<0 \tag{5}$$

where c is a coefficient to be quantized, and abs(c) is the absolute value of c.

The entropy encoder 4 segments the quantization indices input from the quantizer 3 into bit planes, executes binary arithmetic coding in units of bit planes, and outputs a code stream.

Note that "1" is included as the value of the quantization step Δ in this embodiment. In this case, no quantization is done in practice, and the transform coefficients input to the quantizer 3 are directly output to the entropy encoder 4.

The entropy encoder 4 segments the quantization indices input from the quantizer 3 into bit planes, executes binary arithmetic coding in units of bit planes, and outputs a code stream.

Figure 3:
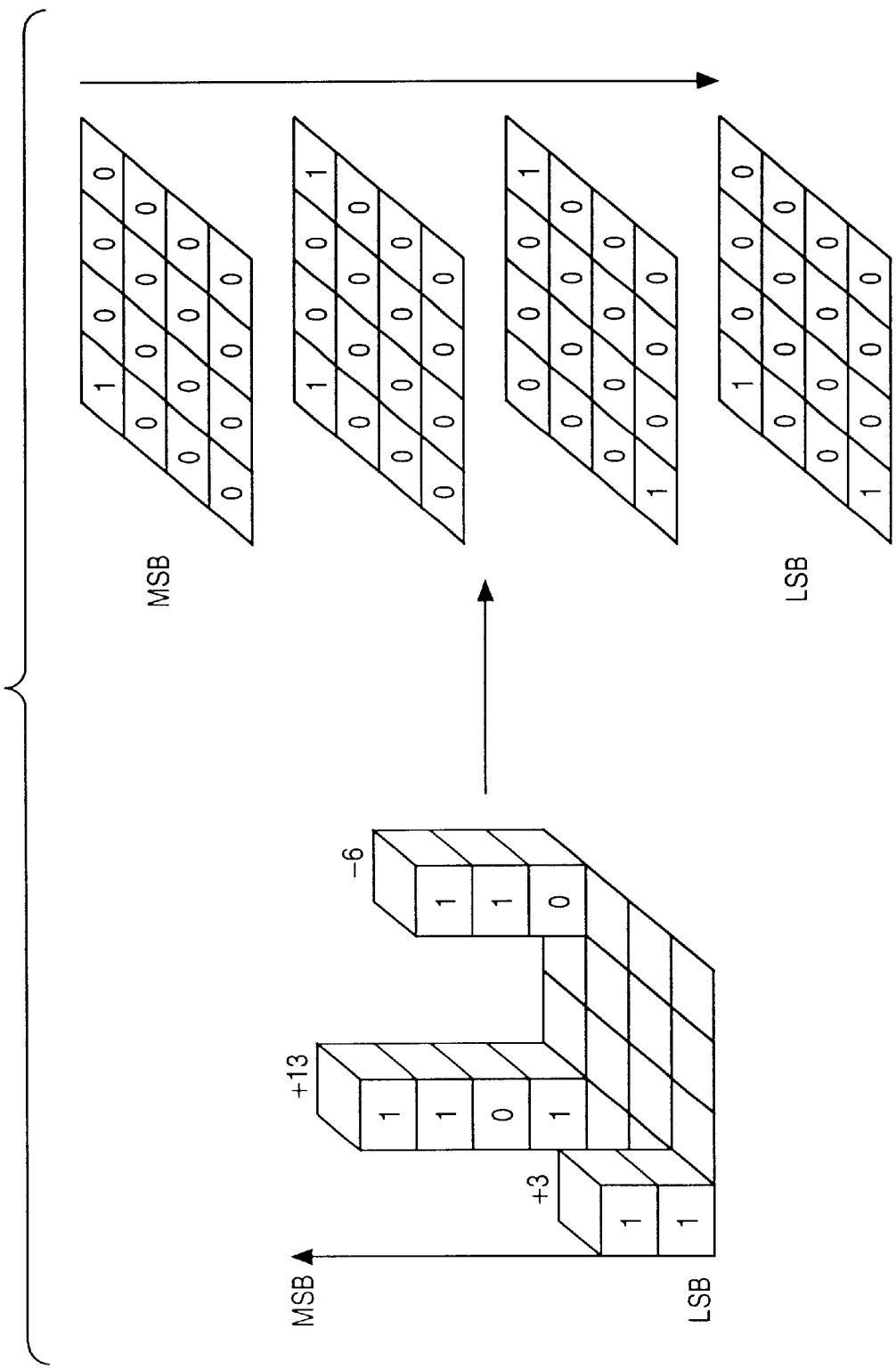
FIG. 3 is a view for explaining the operation of an entropy encoder according to the first embodiment.

FIG. 3 is a view for explaining the operation of the entropy encoder 4. In this example, a 4×4 subband region includes three nonzero indices, which respectively have values "+13", "−6", and "+3". The entropy encoder 4 scans this region to obtain a maximum value M ("13" in this example), and computes the number S of bits required for expressing the maximum quantization index by:

$$S=\text{ceil}(\log_2(\text{abs}(M))) \tag{6}$$

where ceil(x) is the smallest one of integers equal to or larger than x.

In FIG. 3, since the maximum coefficient value is "13", the value of S is "4", and 16 quantization indices in the sequence are processed in units of four bit planes, as indicated by the right side in FIG. 3. The entropy encoder 4 makes binary arithmetic coding of bits of the most significant bit plane (indicated by MSB in FIG. 3) and outputs the coding result as a bitstream. Then, the encoder 4 lowers the bit plane by one level, and encodes and outputs bits of each bit plane to the code output unit 5 until the bit plane of interest reaches the least significant bit plane (indicated by LSB in FIG. 3). At this time, a code of each quantization index is entropy-encoded immediately after the first nonzero bit is detected upon scanning the bit plane. Since this coding includes two different schemes, i.e., resolution and SNR scalable schemes, these schemes will be explained in turn below.

Encoding that adopts the resolution scalable scheme will be explained first.

FIGS. 4A to 4D show the format of a code sequence to be generated and output in this fashion.

Figure 4A:
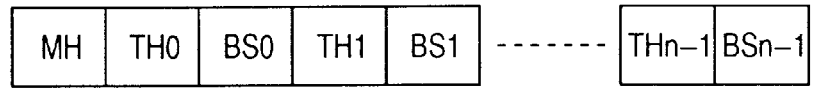
FIGS. 4A to 4D are schematic views showing the format of a code sequence to be generated and output by spatial scalability.
Figure 4B:
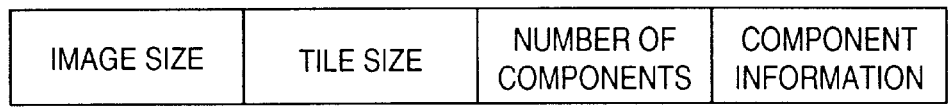

FIG. 4A shows the overall format of a code sequence, in which MH is a main header; THi (i=0 to n−1), a tile header; and BSi (i=0 to n−1), a bitstream. The main header MH is comprised of the size (the numbers of pixels in the horizontal and vertical directions) of an image to be encoded, a tile size upon breaking up the image into tiles as a plurality of rectangular regions, the number of components indicating the number of color components, the size of each component, and component information indicating bit precision, as shown in FIG. 4B. In this embodiment, since an image is not broken up into tiles, the tile size is equal to the image size, and when the image to be encoded is a monochrome multi-valued image, the number of components is "1".

Figure 4C:
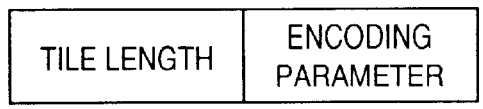

FIG. 4C shows the format of the tile header TH.

The tile header TH consists of a tile length including the bitstream length and header length of the tile of interest, and an encoding parameter for the tile of interest. The encoding parameter includes a discrete wavelet transform level, filter type, and the like.

Figure 4D:
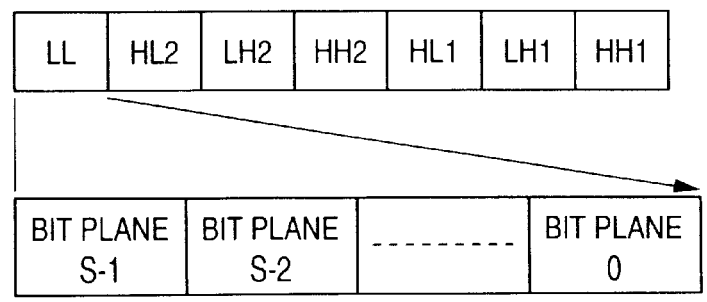

FIG. 4D shows the format of a bitstream in this embodiment. The bitstream is formed in units of bit planes, which are set in the order from an upper bit plane to a lower bit plane. In the bit planes, the encoding results of the bit planes of a given quantization index in each subband are sequentially set in units of subbands. In FIG. 4D, a bitstream is formed in units of subbands, which are set in ascending order of resolution to have a subband of the lowest resolution as the head one. Furthermore, in each subband, codes are set in units of bit planes in the order from an upper bit plane to a lower bit plane. S indicates the number of bits required for expressing the maximum quantization index. The code sequence generated in this manner is output to the code output unit 5.

With this code sequence, hierarchical decoding shown in FIGS. 9A and 9B (to be described later) can be done.

Encoding that adopts the SNR scalable scheme will be explained below.

FIGS. 5A to 5D are schematic views for explaining the format of a code sequence to be generated and output in the SNR scalable scheme.

FIG. 5A shows the overall format of a code sequence, in which MH is a main header; THi (i=0 to n−1), a tile header; and BSi (i=0 to n−1), a bitstream. The main header MH is comprised of the size (the numbers of pixels in the horizontal and vertical directions) of an image to be encoded, a tile size upon breaking up the image into tiles as a plurality of rectangular regions, the number of components indicating the number of color components, the size of each component, and component information indicating bit precision, as shown in FIG. 5B. In this embodiment, since an image is not broken up into tiles, the tile size is equal to the image size, and when the image to be encoded is a monochrome multi-valued image, the number of components is "1".

FIG. 5C shows the format of the tile header TH.

The tile header TH consists of a tile length including the bitstream length and header length of the tile of interest, and an encoding parameter for the tile of interest. The encoding parameter includes a discrete wavelet transform level, filter type, and the like.

FIG. 5D shows the format of a bitstream in this embodiment. The bitstream is formed in units of bit planes, which are set in the order from an upper bit plane (bit plane S-1) to a lower bit plane (bit plane 0). In the bit planes, the encoding results of the bit planes of a given quantization index in each subband are sequentially set in units of subbands. In FIG. 5D, S indicates the number of bits required for expressing the maximum quantization index. The code sequence generated in this manner is output to the code output unit 5.

With this code sequence, hierarchical decoding shown in FIGS. 10A and 10B (to be described later) can be done.

In this embodiment, the compression ratio of the entire image to be encoded can be controlled by changing the quantization step $\Delta$.

As another method, in this embodiment, lower bits of a bit plane to be encoded by the entropy encoder 4 can be limited (discarded) in correspondence with a required compression ratio. In this case, all bit planes are not encoded, but bit planes from the most significant bit plane to a bit plane corresponding in number to the required compression ratio are encoded and are included in a final code sequence.

The method of decoding a bitstream encoded by the aforementioned image encoding apparatus will be explained below.

Figure 6:
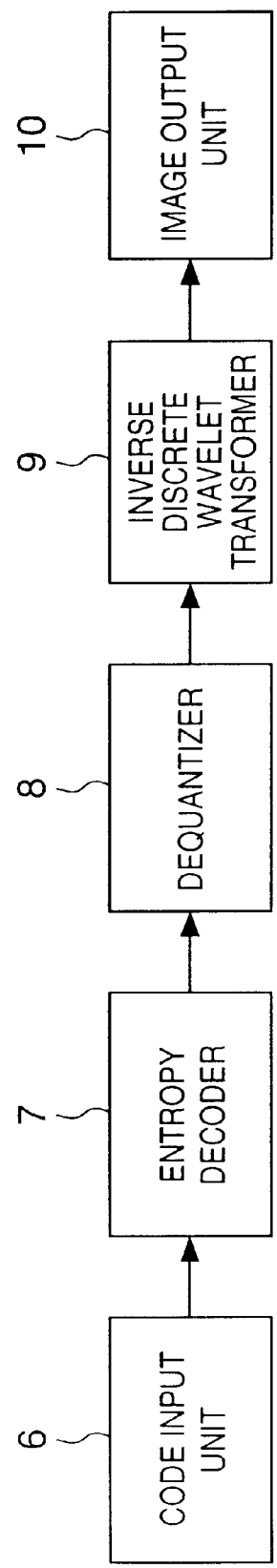
FIG. 6 is a block diagram showing the arrangement of an image decoding apparatus according to the first embodiment.

FIG. 6 is a block diagram showing the arrangement of an image decoding apparatus according to this embodiment. Reference numeral 6 denotes a code input unit; 7, an entropy decoder; 8, a dequantizer; 9, an inverse discrete wavelet transformer; and 10, an image output unit.

The code input unit 6 receives a code sequence encoded by, e.g., the aforementioned encoding apparatus, analyzes the header included in that sequence to extract parameters required for the subsequent processes, and controls the flow of processes if necessary or outputs required parameters to the subsequent processing units. The bitstreams included in the input code sequence are output to the entropy decoder 7.

The entropy decoder 7 decodes and outputs the bitstreams in units of bit planes. FIG. 7 shows the decoding sequence at that time.

The left side in FIG. 7 illustrates the flow for sequentially decoding one subband region to be decoded in units of bit planes to finally restore a quantization index, and bit planes are decoded in the order of an arrow. The restored quantization indices are output to the dequantizer 8.

The dequantizer 8 receives the decoded discrete wavelet transform coefficients and restores them by:

$$c'=\Delta \times q; \quad q \neq 0 \qquad (7)$$

$$c'=0; \quad q=0 \qquad (8)$$

where q is the quantization index, and $\Delta$ is the quantization step, which is the same value used upon encoding. c' is the restored transform coefficient, which is obtained by restoring a coefficient s or d in encoding. This transform coefficient c' is output to the inverse discrete wavelet transformer 9.

Figure 8A:
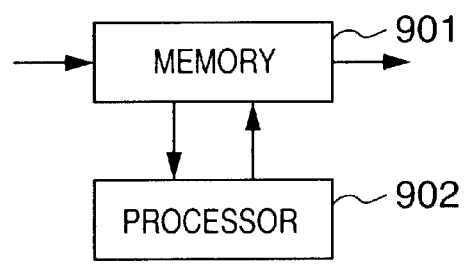
FIGS. 8A and 8B are block diagrams showing the arrangement of a wavelet decoder according to the first embodiment.
Figure 8B:
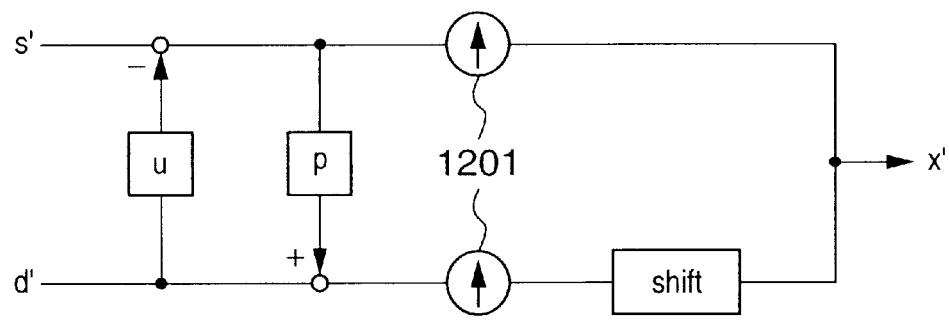

FIGS. 8A and 8B are block diagrams showing the arrangement and process of the inverse discrete wavelet transformer 9.

Referring to FIG. 8A, the input transform coefficients are stored in a memory 901. A processor 902 executes a linear inverse discrete wavelet transform process while sequentially reading out the transform coefficients from the memory 901, thus implementing a two-dimensional inverse discrete wavelet transform process. The two-dimensional inverse discrete wavelet transform process is executed in a sequence opposite to the forward discrete wavelet transform process, but since its details are known to those who are skilled in the art, a description thereof will be omitted.

FIG. 8B shows processing blocks of the processor 902. The input transform coefficients undergo two filter processes of filters u and p, and are added after being up-sampled by up samplers 1201, thus outputting an image signal x'. These processes are described by:

$$x'(2n)=s'(n) - \text{floor}((d'(n-1)+d'(n))/4) \quad (9)$$

$$x'(2n+1)=d'(n) + \text{floor}((x'(2n)+x'(2n+2))/2) \quad (10)$$

Since the forward and inverse discrete wavelet transform processes given by equations (1), (2), (9), and (10) satisfy a perfect reconstruction condition, the restored image signal x' matches the original image signal x as long as the quantization step $\Delta$ is "1" and all bit planes are decoded in bit plane decoding in this embodiment.

With the aforementioned process, the original image is reclaimed and is output to the image output unit 10. Note that the image output unit 10 may be an image display device such as a monitor or the like, or may be a storage device such as a magnetic disk or the like.

Decoding that adopts the resolution scalable scheme will be explained below.

Figure 9A:
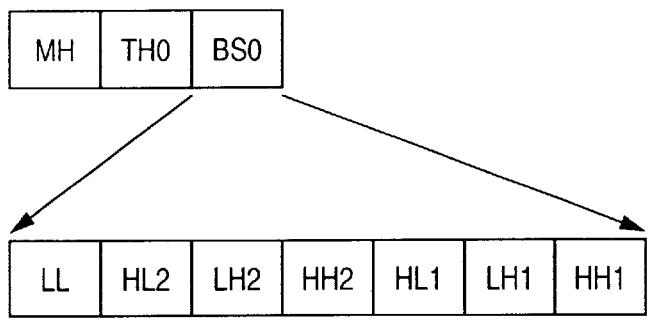
FIGS. 9A and 9B are views for explaining an example of a code sequence in case of spatial scalability, subbands upon decoding the code sequence, the sizes of images to be displayed in correspondence with the progress of decoding, and a change in reproduced image upon decoding code sequences of subbands.
Figure 9B:
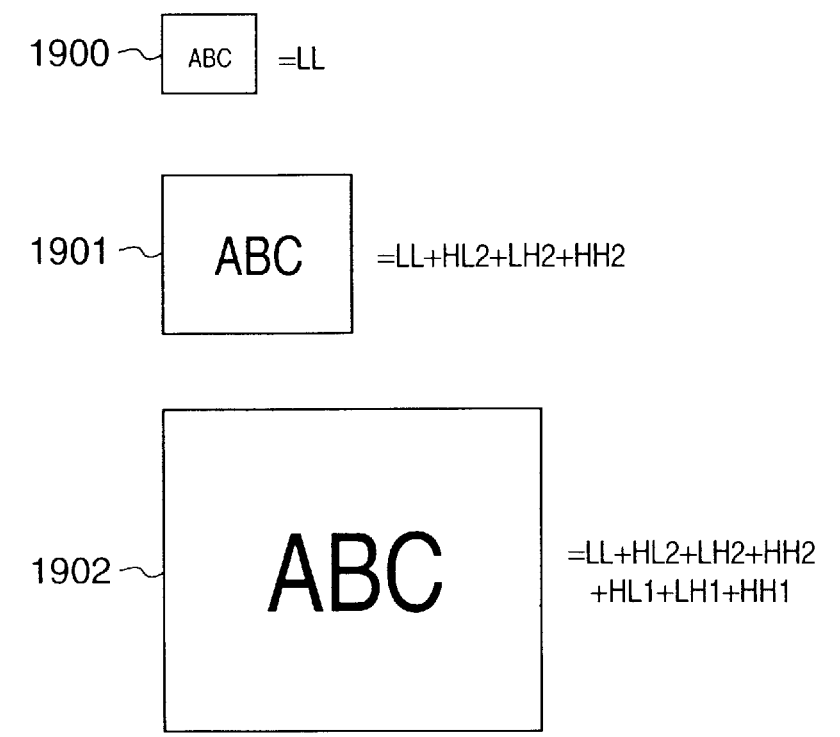

FIGS. 9A and 9B are views for explaining restoration and display of an image in the image decoding apparatus of this embodiment.

FIG. 9A shows an example of a code sequence, the basic format of which is based on FIGS. 4A to 4D. In this case, the entire image is set as a tile and, hence, the code sequence includes only one tile header (TH0) and bitstream (BS0). In this bitstream (BS0), codes are set in turn from LL as a subband corresponding to the lowest resolution in ascending order of resolution, as shown in FIG. 9A.

The image decoding apparatus sequentially reads this bitstream, and displays an image upon completion of decoding of codes corresponding to each subband.

FIG. 9B shows subbands to be decoded and the sizes of an image to be displayed in correspondence with these subbands. In this example, two-dimensional discrete wavelet transformation is done in two levels. 1900 indicates an image which is displayed by decoding LL alone. In this case, an image, in which the numbers of pixels are reduced to ¼ in the horizontal and vertical directions with respect to an original image, is restored. 1901 indicates an example of an image which is displayed by further reading the bitstream, and decoding all subbands (HL2, LH2, HH2) of level 2. In this case, an image, in which the numbers of pixels are reduced to ½ in the horizontal and vertical directions with respect to an original image, is restored. 1902 indicates an example of an image when all subbands of level 1 are decoded, and an image which has the same numbers of pixels as those of the original image is restored.

Rasterization upon encoding by the SNR scalable scheme will be explained below.

The image display pattern upon restoring and displaying an image in the aforementioned sequence will be explained using FIGS. 10A and 10B.

Figure 10A:
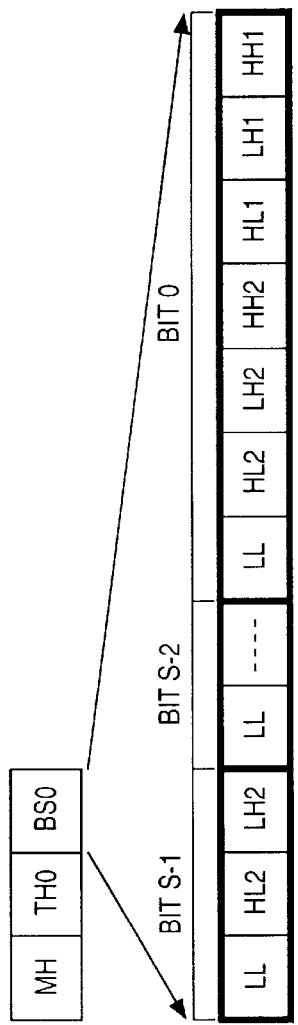
FIGS. 10A and 10B are views for explaining an example of a code sequence in case of SNR scalability and its decoding process.
Figure 10B:
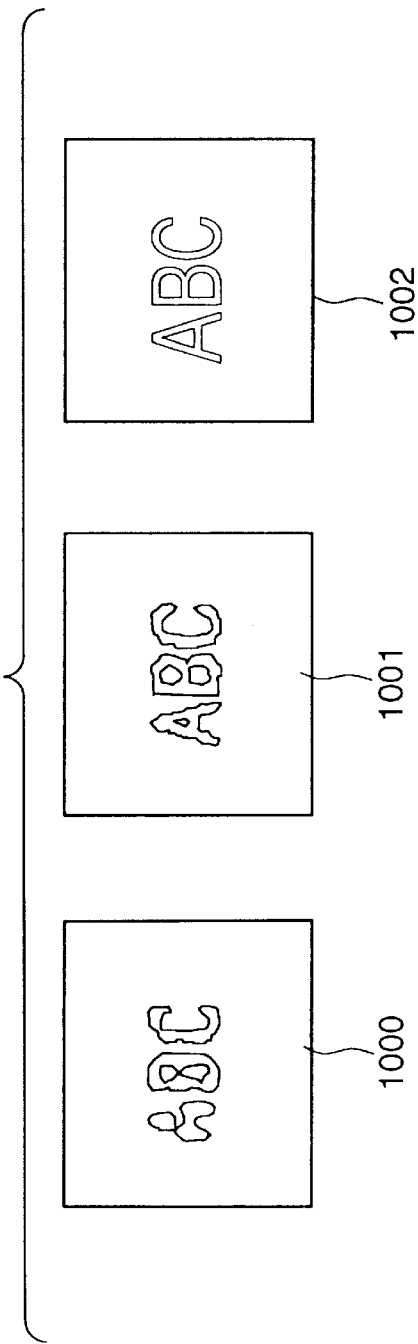

FIG. 10A shows an example of a code sequence, the basic format of which is based on FIGS. 5A to 5D, but the entire image is set as a tile in this case. Hence, the code sequence includes only one tile header (TH0) and bitstream (BS0). In this bitstream BS0, codes are set from the most significant bit plane (bit (S-1)) to the least significant bit plane (bit (0)).

The decoding apparatus sequentially reads this bitstream, and displays an image upon completion of decoding of codes of each bit plane. FIG. 10B shows an example of a change in image quality of an image to be displayed when decoding is done in turn from an upper bit plane. 1000 indicates an example of an image when only the most significant bit plane (bit (S-1)) is decoded. In this case, only the overall feature of the image is displayed. By contrast, 1001 indicates a display example when decoding has progressed up to bit (S-2), and 1002 indicates a case after the least significant bit plane (bit 0) is displayed. In this manner, the image quality improves as lower bit planes are decoded. When the quantization step $\Delta$ in quantization is "1", the image displayed after all the bit planes are decoded is the same as the original image.

In the aforementioned embodiment, when the entropy decoder 7 limits (ignores) lower bit planes to be decoded, the encoded data to be received or processed is reduced, and the compression ratio can be consequently controlled. In this manner, a decoded image with required image quality can be obtained from only encoded data of the required data volume. When the quantization step $\Delta$ upon encoding is "1", and all bit planes are decoded upon decoding, the restored image matches an original image, i.e., reversible encoding and decoding can be realized.

First Embodiment

Characteristic features according to the first embodiment of the present invention will be described below.

FIG. 11 is a block diagram showing the arrangement of an image processing apparatus according to the first embodiment of the present invention.

Referring to FIG. 11, reference numeral 501 denotes a DWT encoder (encoding unit) which has an arrangement, as shown in, e.g., FIG. 1. The DWT encoder 501 encodes a newly input image by DWT. Since some images may have already been compressed by other encoding schemes such as DCT and the like, such image is temporarily decoded to a two-dimensional image by a decoding apparatus (not shown) and is input to and encoded by this DWT encoder 501 again.

The image data encoded by the DWT encoder 501 is stored in an internal storage unit 511 via an internal bus 505 or is stored in an external storage device (not shown) via a network 506. A list of all images stored in this manner are managed by an image file manager 502.

If an input image is, e.g., a medical image, it is required to be saved for a long period of time as a proof of diagnosis. Taking an X-ray image as an example, one X-ray image has an image data size of 10 to 20 Mbytes, and around 1,000 such X-ray images are generated per day in a large hospital. Hence, such images cannot be saved without compression. However, it is not appropriate to compress X-ray images immediately after image sensing or those of a patient under treatment at a high compression ratio, since a delicate difference of X-ray images must be observed in progress observation. Hence, an appropriate compression ratio must be determined for each X-ray image to be held, and an image must be compressed and saved at the determined compression ratio.

The image file manager 502 checks the attributes of managed image files periodically (e.g., everyday or every week). The image files may be managed inside the apparatus via the internal bus 505 or may be stored and managed in an external storage device (not shown) via the network 506. Note that the image file manager 502 may refer to attribute files held in each storage device at a timing at which the attribute information of a given image file is changed or managed. The attributes of the image file include an image type, a sensed portion, the number of days elapsed after the image sensing date, the number of days elapsed after the diagnosis date when that image was referred to, the number of days elapsed after the last access date to that image, a current compression ratio, and the like in addition to patient information.

As the types of such images, X-ray images, CT images, MRI images, and the like are known. Since CT and MRI images normally have a higher density resolution than X-ray images, their compression ratios can be set to be higher than that of X-ray images. Also, sensed portion information is effective as information that pertains to an X-ray image. For example, since a chest image normally contains finer pieces of information than a head image, a high compression ratio can hardly be set for the chest image. The number of days elapsed after the image sensing date and the number of days elapsed after the image diagnosis date can be used as data for determining the compression ratio of a given image on the basis of a legal saving obligation of that image, a guideline for the saving period in the hospital, and the like.

The compression ratio of that image is temporarily determined based on the aforementioned criteria, but the final compression ratio is determined on the basis of the number of days elapsed after the final access date to that image, the outpatient service history of a corresponding patient, and the like. For example, when an image is very old (e.g., an image taken seven years ago), a compression ratio of around 50% which is temporarily determined based on the image sensing date and the like is adopted. However, when a patient corresponding to that image is still visiting the hospital for the same disease, it is finally determined that the compression ratio of that image is suppressed to around 20%.

In this fashion, the image file manager 502 finally determines the compression ratio of a given image, and compares the determined compression ratio with the current compression ratio of the file. If the compression ratio of the image file must be increased, an image file input unit 504 fetches that image. Alternatively, when the image is input from an external device, it may be transferred from the external device. At the same time, the finally determined compression ratio is transferred to a compression ratio determination unit 503, and is instructed to a compression ratio change unit 507.

The compression ratio change unit 507 analyzes the input image file, and computes the cut amount of a bitstream to obtain the target compression ratio. In compression coding using DWT, two different schemes, i.e., resolution scalability and SNR scalability, are available. The methods of obtaining the cut amount in correspondence with these two schemes will be explained below.

As has been explained above with reference to FIGS. 9A and 9B, resolution scalability promptly displays a small image upon transferring and reading out the file, and gradually displays larger images as file transfer and read progress. In this case, in order to increase the compression ratio encoded in units of subbands upon encoding, as shown in FIG. 9A, for example, information of a subband HH1 corresponding to the highest frequency range can be deleted. Furthermore, when the compression ratio becomes too high if the subband HH1 is deleted, since the subband HH1 is encoded in units of bit planes, information can be deleted in turn from the bit plane of the lowest level.

The method for SNR scalability that has been explained using FIGS. 10A and 10B will be explained below.

In this case, an image is encoded so that images with higher SNR are displayed as transfer or read progresses, as described above. Since an image is encoded in units of bit planes in this scheme, as shown in FIG. 10A, the compression ratio can be easily increased by deleting information in units of lower bit planes. In FIG. 10A, bit 0 (Bit 0) has the lowest level. However, in this case as well, when the compression ratio becomes too high if a plane of bit 0 is deleted, information can be deleted in turn from a bit plane corresponding to a high-frequency subband in the plane of bit 0.

As described above, according to the first embodiment, since the compression ratio is changed by deleting data in units of bit planes, many computations for changing the compression ratio can be done away with.

In the above description, the bitstream deletion methods for resolution scalability and SNR scalability have been explained. However, the present invention is not limited to such specific methods. For example, data may be deleted in the order of bit planes in resolution scalability, or may be deleted in the order of subbands in SNR scalability. However, this method requires more arithmetic operations than the aforementioned methods, and poses a problem especially for a large image.

The image file which has been compressed by the compression ratio change unit 507 to have a target compression ratio or less is output from an image file output unit 508 to the storage unit 511, and is stored therein. When the image file is output onto the network 506, an image may be requested from an external storage device via that network and may be sent to the external storage device. A DWT decoder 509 corresponds to the image decoding apparatus that has been explained using FIG. 6, and an image display unit 510 displays an image decoded by the DWT decoder 509.

Figure 12:
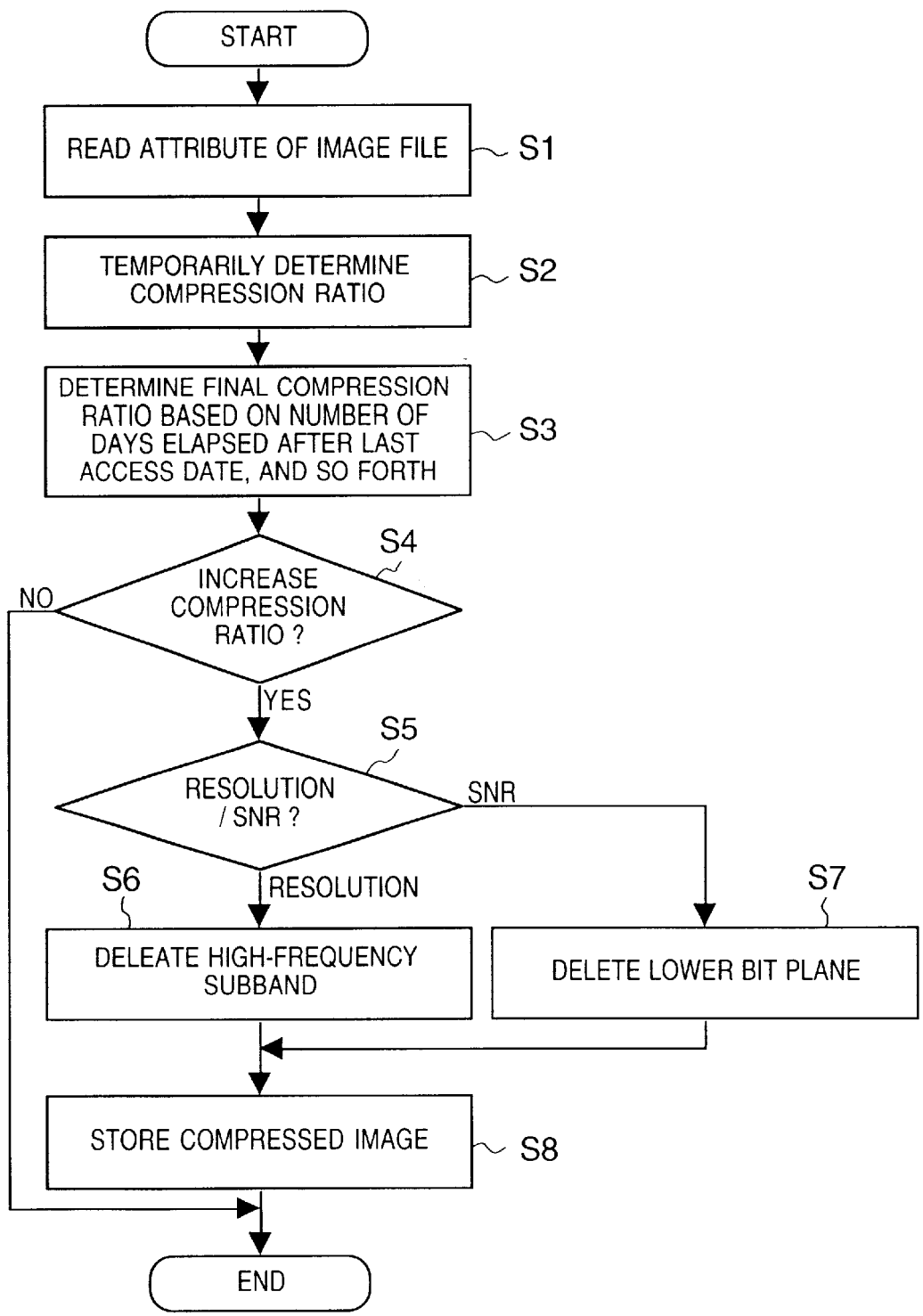
FIG. 12 is a flow chart showing an image compression ratio update process in the image processing apparatus according to the first embodiment of the present invention.

FIG. 12 is a flow chart showing the image compression ratio update process in the image processing apparatus according to the first embodiment of the present invention.

In step S1, the attributes of the image file input from the image file input unit 504 are read. As described above, the attributes of the image file include an image type, a sensed portion, the number of days elapsed after the image sensing date, the number of days elapsed after the diagnosis date when that image was referred to, the number of days elapsed after the last access date to that image, a current compression ratio, and the like in addition to patient information. Since CT and MRI images as the image types normally have a higher density resolution than X-ray images, their compression ratios can be set to be higher than that of X-ray images. Also, sensed portion information is effective as information that pertains to an X-ray image. For example, since a chest image normally contains finer pieces of information than a head image, a high compression ratio is hardly set for the chest image. The number of days elapsed after the image sensing date and the number of days elapsed after the image diagnosis date can be used as data for determining the compression ratio of a given image on the basis of a legal saving obligation of that image, a guideline for the saving period in the hospital, and the like. In step S2, the compression ratio of that image is temporarily determined based on these criteria.

The flow advances to step S3 to determine the final compression ratio on the basis of the number of days elapsed after the final access date to that image, the outpatient service history of a corresponding patient, and the like. After the compression ratio of that image is finally determined, the flow advances to step S4 to compare that compression ratio with the current compression ratio of the file. If the compression ratio must be increased, the flow advances to step S5, and the image file input unit 504 fetches that image file. Alternatively, when the image is input from an external device, it is transferred from the external device. At the same time, the finally determined compression ratio is sent to the compression ratio determination unit 503 and is instructed to the compression ratio change unit 507. Furthermore, it is checked if data is encoded by resolution or SNR scalability. If it is determined that data is encoded by resolution scalability, the flow advances to step S6 to delete information of a subband HH1 as the highest frequency range. In this case, when the compression ratio becomes too high if the subband HH1 is deleted, data is deleted in turn from a bit plane of the lowest level in the subband HH1, as described above.

On the other hand, if it is determined that data is encoded by SNR scalability, the flow advances to step S7 to delete data in turn from a lower bit plane in units of bit planes. In this case as well, when the compression ratio becomes too high if a plane of bit 0 is deleted, information is deleted in turn from a bit plane corresponding to a high-frequency subband in the plane of bit 0. The image which is compressed at the compression ratio updated in step S6 or S7 in this manner is output from the image file output unit 508. If it is determined in step S4 that the compression ratio is not increased, i.e., if the compression ratio is not changed, the flow ends without any process.

As described above, according to the first embodiment, an image management system that uses a simple method for increasing the compression ratio in association with coding which exploits DWT has been proposed. With this system, since arithmetic operations for decoding a compressed image, and then compressing the decoded image again can be omitted, high-speed image management can be realized.

Second Embodiment

The second embodiment of the present invention will be described below. The first characteristic features of the second embodiment lie in that codes of a non-region-of-interest in an image file are deleted to obtain a target compression ratio upon changing the compression ratio of the image file that is compressed using DWT, and bitstreams are deleted in units of subbands as a feature of coding that exploits DWT to reduce the data size of the image file and to set a higher compression ratio without restoring a two-dimensional image and recompressing that image using a new compression ratio, when the image file must be further compressed. Also, in order to reduce the image data size to be saved, a bitstream may be omitted in units of bit planes.

The second embodiment will be described in detail below.

Figure 13:
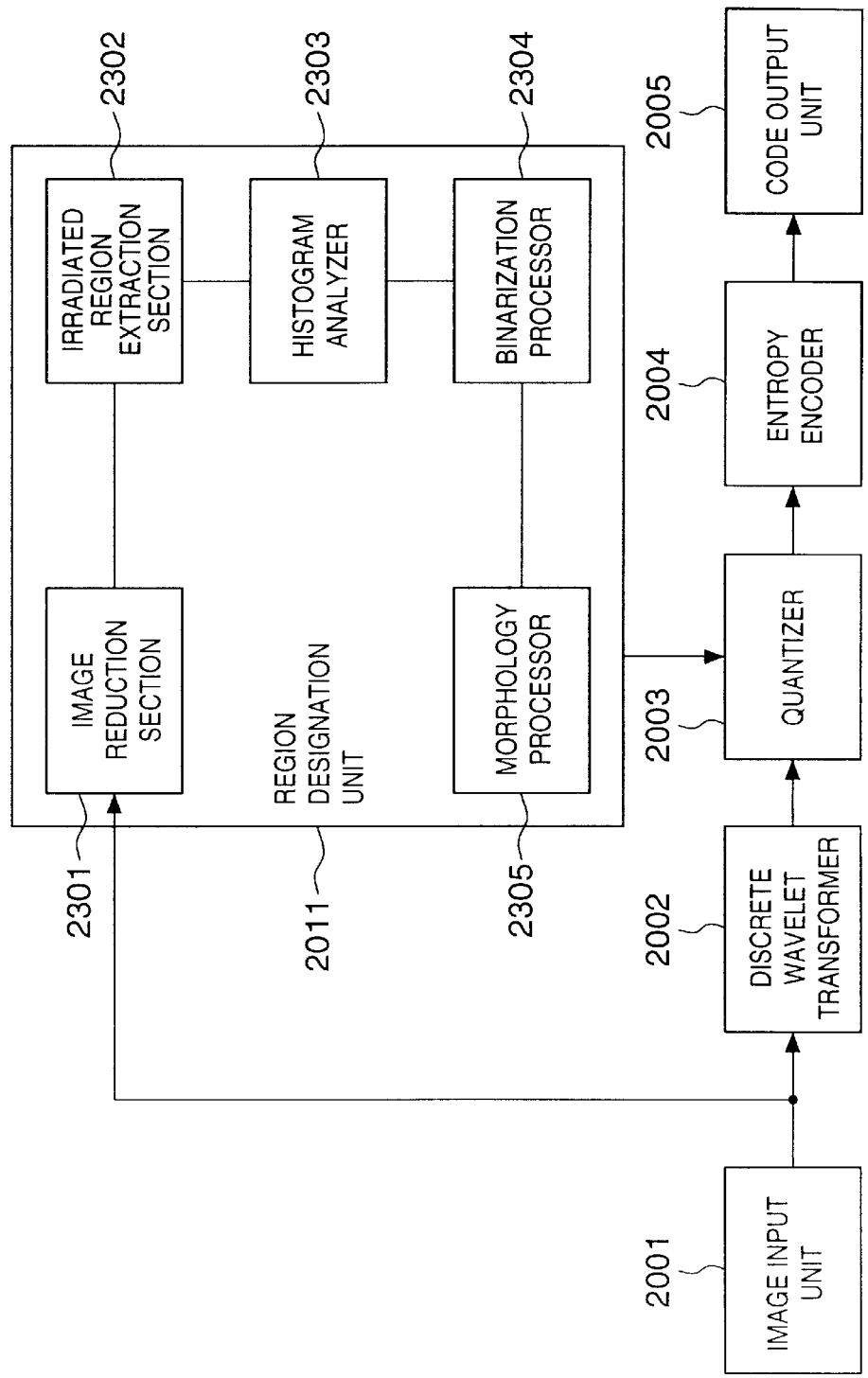
FIG. 13 is a block diagram showing the arrangement of an image encoding apparatus according to the second embodiment of the present invention.

FIG. 13 is a block diagram showing the arrangement of an image encoding apparatus according to the second embodiment of the present invention.

Referring to FIG. 13, reference numeral 2001 denotes an image input unit for inputting image data. The image input unit 2001 comprises an image sensing device such as a scanner, digital camera, or the like for scanning a document image, an interface unit having an interface function with a communication line, or the like. Reference numeral 2002 denotes a discrete wavelet transformer for computing the two-dimensional discrete wavelet transform of the input image. Reference numeral 2003 denotes a quantizer for quantizing coefficients obtained by discrete wavelet transformation of the discrete wavelet transformer 2002. Reference numeral 2004 denotes an entropy encoder for entropy-encoding the coefficients quantized by the quantizer 2003. Reference numeral 2005 denotes a code output unit for outputting codes encoded by the entropy encoder 2004. Reference numeral 2011 denotes a region designation unit for designating the region of interest of an image input from the image input unit 2001.

Note that the apparatus according to the second embodiment is not limited to a dedicated apparatus shown in FIG. 13, and the present invention can be applied to, e.g., a case wherein a versatile PC or workstation loads a program to implement the aforementioned functions.

In the above arrangement, the image input unit 2001 inputs pixel signals that form an image to be encoded in the raster scan order, and its output is input to the discrete wavelet transformer 2002. In the following description, an image signal input from the image input unit 2001 is expressed by a monochrome multi-valued image. However, upon encoding a plurality of color components of a color image or the like, each of R, G, and B color components or luminance and chromaticity components can be compressed as the monochrome component.

The discrete wavelet transformer 2002 executes a two-dimensional wavelet transformation process for the input image signal, and computes and outputs transform coefficients. Note that the arrangement of the discrete wavelet transformer 2002 is the same as that of the discrete wavelet transformer 2 that has been explained earlier with reference to FIGS. 2A to 2C in the first embodiment, and a detailed description thereof will be omitted.

The region designation unit 2011 determines an ROI (Region Of Interest) to be decoded to have higher image quality than surrounding portions in an image to be encoded, and generates mask information indicating coefficients that belong to the ROI upon computing the discrete wavelet transforms of the image to be encoded. Note that details of the region designation unit 2011 will be described later.

Figure 14A:
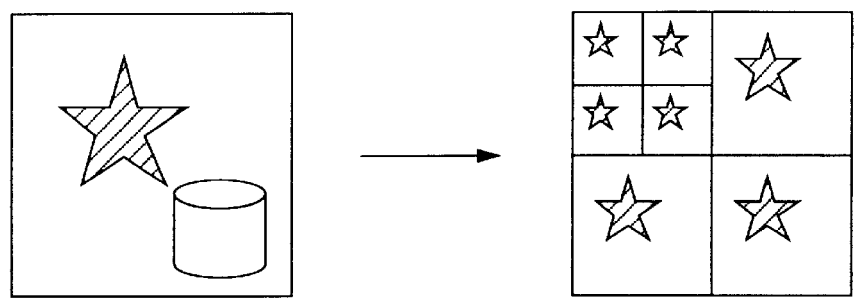
FIGS. 14A to 14C are views for explaining transformation of the region of interest (designated region) in an image and bit shifts of image data in that region according to the second embodiment.
Figure 14B:
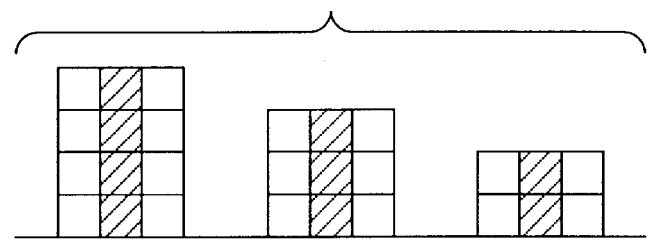
Figure 14C:
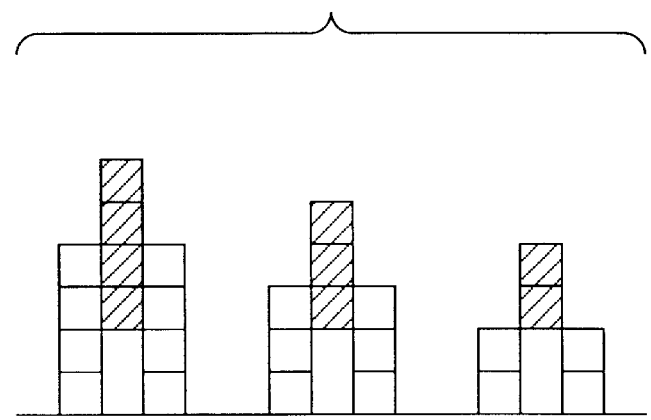

FIGS. 14A to 14C are views for explaining the principle upon generating mask information.

Assuming that a star-shaped region is designated as the ROI (to be referred to as a designated region hereinafter), as shown in the left image in FIG. 14A, the region designation unit 2011 computes portions to be included in respective subbands upon computing the discrete wavelet transforms of the image including this designated region. The region indicated by this mask information corresponds to a range including transform coefficients of the surrounding region required for reconstructing an image signal on the boundary of the designated region.

The right image in FIG. 14A shows an example of the mask information computed in this way. In this example, mask information upon discrete wavelet transformation of the left image to two levels in FIG. 14A is computed, as shown in FIG. 14A. In FIG. 14A, a star-shaped portion corresponds to the designated region, bits of the mask information in this designated region are set at "1", and other bits of the mask information are set at "0". Since the entire mask information has the same format as transform coefficients of two-dimensional discrete wavelet transformation, whether or not a coefficient at a given position belongs to the designated region can be identified by checking the corresponding bit in the mask information. The mask information generated in this manner is output to the quantizer 2003.

Furthermore, the region designation unit 2011 receives parameters for designating image quality of that designated region from an input system (not shown). These parameters may be either numerical values that express a compression ratio to be assigned to the designated region or those indicating image quality. In this case, the compression ratio to be assigned can be determined by portion information of the sensed image. The sensed portion information indicates the sensed portion and direction such as a front chest image, side head image, or the like in case of X-ray images. Such information may be input by the operator using a control panel (not shown) of the image input unit 2001 or may be transferred from a radiation information system (not shown) prior to image sensing. In general, since chest image contains soft tissue, it is required not to set so high compression ratio. On the other hand, a bone image like a head image hardly deteriorates considerably even when a high compression ratio is set. The region designation unit 2011 computes a bit shift amount B for coefficients in the designated region, and outputs it to the quantizer 2003 together with the mask information.

The arrangement of the region designation unit 2011 that automatically determines the designated region (ROI) will be explained in detail below.

As shown in FIG. 13, the region designation unit 2011 comprises an image reduction section 2301, an irradiated region extraction section 2302, a histogram analyzer 2303, a binarization processor 2304, and a morphology processor 2305. The image reduction section 2301 outputs a reduced-scale image of about (336×336) pixels with respect to an input image of (2,688×2,688) pixels. In order to shorten the arithmetic operation time of the subsequent processes, the pixel value of an input image may be expressed by 12 bits, and the input image may be converted into 8-bit reduced-scale image data by dropping lower 4 bits of the 12-bit pixel data.

The irradiated region extraction section 2302 extracts the distribution of X-ray incident regions of the entire input image. The X-ray incident regions may be distributed on the entire input image but only a given portion may be irradiated with X-rays (such case corresponds to the "presence of an irradiation field stop").

The process for discriminating the presence/absence of an irradiation field stop will be explained first with reference to FIGS. 15A to 17.

Figure 15C:
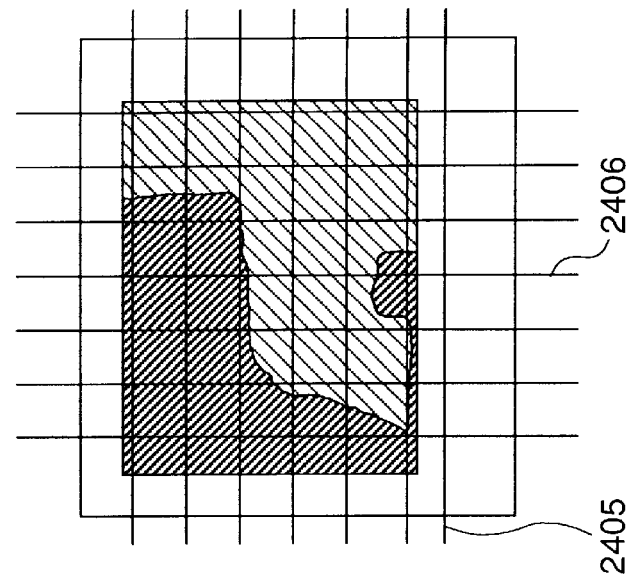
FIGS. 15A to 15C are views for explaining an example of the region of interest extracted from the irradiated region of an X-ray image according to the second embodiment.
Figure 15B:
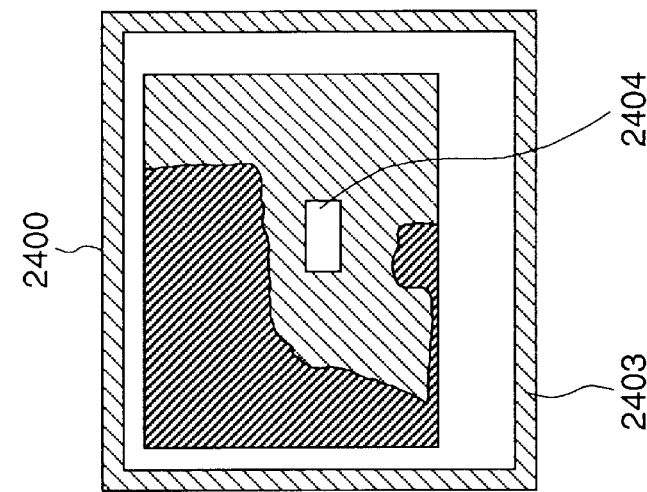
Figure 15A:
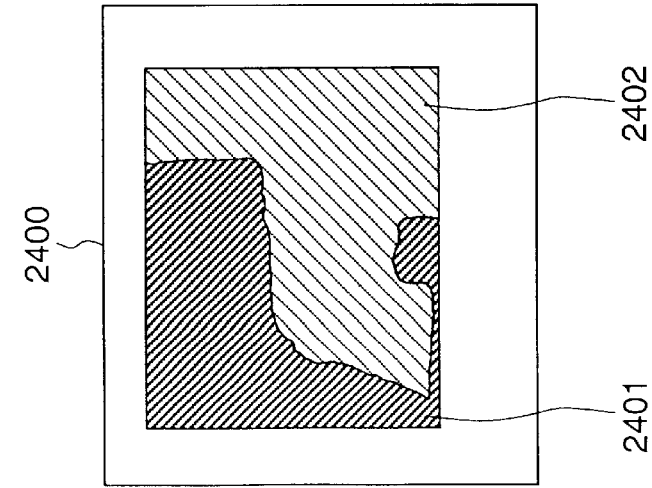

FIG. 15A shows an example of an input image. If this input image region 2400 has an irradiation field stop, and includes an X-ray non-irradiated portion, such non-irradiated portion may be present on a peripheral region of the image. For this reason, the average pixel value of the peripheral region of the input image region 2400 is compared with that of the central portion of the input image. If the average pixel value of the peripheral region is around 5% or more smaller than that of the central portion, it can be empirically determined that the image has an irradiation field stop. In FIG. 15A, reference numeral 2401 denotes an X-ray irradiated region; and 2402, an ROI.

FIG. 15B shows an example of a peripheral region 2403 and central region 2404 in the input image region 2400.

If the irradiation field stop is present, some profiles are extracted respectively in the vertical and horizontal directions of the input image region 2400. Two peak points are extracted from the second derivatives of these extracted profiles. The coordinates of the peak values of the second derivatives of a plurality of profiles are computed to obtain an average line segment, thus obtaining a line segment which indicates the irradiation field region.

FIG. 15C exemplifies the positions of horizontal and vertical profiles 2405 and 2406 as examples of profile positions.

Figure 16A:
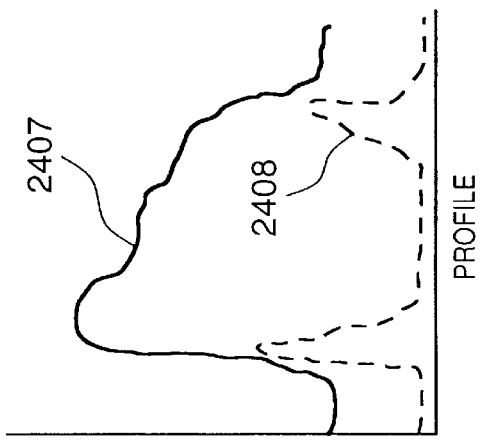
FIGS. 16A to 16C are views for explaining an example of the region of interest extracted from the irradiated region of an X-ray image according to the second embodiment.
Figure 16B:
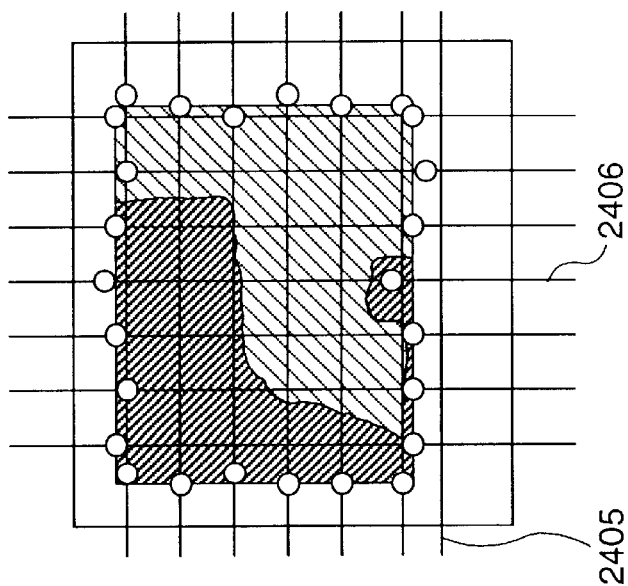
Figure 16C:
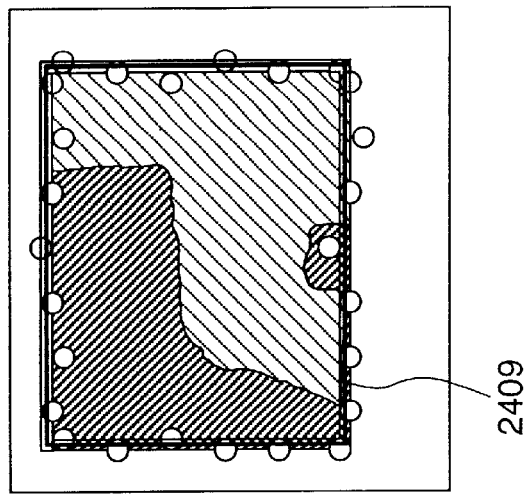

FIG. 16A shows an example of second derivative peak detection. In FIG. 16A, a solid curve 2407 indicates a profile detection result, and a dotted curve 2408 indicates a second derivative result. FIG. 16B shows the detection positions of the horizontal and vertical profiles 2405 and 2406 by circular marks. Also, FIG. 16C shows a finally extracted irradiation field region 2409.

The histogram analyzer 2303 computes the frequencies of occurrence of pixel values for the irradiation field region 2409 extracted as the irradiated region by the irradiated region extraction section 2302. Note that the dose increases with increasing pixel value. It is checked based on the histogram analysis result if a through region is present. When a through region is present, since two peaks are present, the presence/absence of a through region can be determined based on them.

In general, upon sensing an image of an abdomen, chest, or the like that has an irradiation field stop but no through region, only one peak appears despite of the presence of bones and soft tissue. In the method of detecting the number of peaks, a histogram which is assumed to be a waveform is filtered using a low-pass filter, and then undergoes a second derivative process. When the second derivative process value exceeds a threshold value which is set empirically, the presence of a peak is determined. In very rare occasions, no peak is detected or three or more peaks are detected. When no peak is detected, the absence of a through region is determined; when three or more peaks are detected, two out of three or more peaks are selected in descending order, and a peak having a larger pixel value is determined to be a through region.

FIG. 17 shows the histogram in the irradiated region 2401, and a peak 2601 of the detected through region. When the presence of a through region is determined, binarization is done by the binarization processor 2304 using a peak value SP of that through region. A region having pixel values equal to or larger than the peak value SP is determined to be a through region, and a region having pixel values smaller than the peak value SP is determined to be a region to be sensed.

Since the binarization process of the binarization processor 2304 is likely to leave isolated points or a through region, the morphology processor 2305 executes a filter process. Erosion for removing the isolated points and remaining through region is done for around three to five pixels. After that, a labeling process is done to limit to one continuous region. In this state, since a continuous region may have a hole, the hole is closed by a closing process. That output result corresponds to the ROI obtained by removing the through region from the irradiation field region 2409. In the following description, assume that the ROI has a star shape shown in FIG. 14A for the sake of convenience.

The quantizer 2003 quantizes the input coefficients by a predetermined quantization step, and outputs indices corresponding to the quantized values. Note that the quantization process is basically the same as that of the quantizer 3 in the first embodiment mentioned above, and differences will be mainly explained below.

The quantizer 2003 changes the quantization index on the basis of the mask and shift amount B input from the region designation unit 2011 by:

$$q' = q \times 2^B;\ m=1 \quad (11)$$

$$q' = q;\ m=0 \quad (12)$$

where m is the mask value at the position of the quantization index of interest. With the aforementioned process, only quantization indices that belong to the spatial region designated by the region designation unit 2011 are shifted to the MSB side by B bits.

FIGS. 14B and 14C are views for explaining changes in quantization index by the shift-up process. In FIG. 14B, when three quantization indices are respectively present in three subbands, and the mask value="1" and the shift value B="2" in the hatched quantization indices, the quantization indices after bit shifts are as shown in FIG. 14C.

The quantization indices changed in this manner are output to the entropy encoder 2004.

The entropy encoder 2004 segments the quantization indices input from the quantizer 2003 into bit planes, executes binary arithmetic coding in units of bit planes, and outputs a code stream. Since the operation of the entropy encoder 2004 is the same as that of the entropy encoder 4 in the first embodiment mentioned above, a description thereof will be omitted.

Since entropy coding includes two schemes, i.e., a resolution scalable scheme and SNR scalable scheme, and different bitstream deletion methods are used in correspondence with these schemes, these schemes will be explained in turn below.

Encoding that uses the resolution scalable scheme will be explained first.

FIGS. 18A to 18D show the format of a code sequence to be generated and output in this fashion.

FIG. 18A shows the overall format of a code sequence, in which MH is a main header; THi (i=0 to n—1), a tile header; and BSi (i=0 to n−1), a bitstream. The main header MH is comprised of the size (the numbers of pixels in the horizontal and vertical directions) of an image to be encoded, a tile size upon breaking up the image into tiles as a plurality of rectangular regions, the number of components indicating the number of color components, the size of each component, and component information indicating bit precision, as shown in FIG. 18B. In the second embodiment, since an image is not broken up into tiles, the tile size is equal to the image size, and when the image to be encoded is a monochrome multi-valued image, the number of components is "1".

FIG. 18C shows the format of the tile header TH. The tile header TH consists of a tile length including the bitstream length and header length of the tile of interest, an encoding parameter for the tile of interest, mask information indicating the designated region, and the bit shift amount for coefficients that belong to the designated region. The encoding parameter includes a discrete wavelet transform level, filter type, and the like.

FIG. 18D shows the format of a bitstream in the second embodiment. In FIG. 18D, the bitstream is formed in units of subbands, which are arranged in turn from a subband (LL) having a low resolution in ascending order of resolution. Furthermore, in each subband, codes are set in units of bit planes, i.e., in the order from an upper bit plane (bit plane (S-1)) to a lower bit plane (bit plane 0).

With this code sequence, hierarchical decoding shown in FIGS. 21A and 21B (to be described later) can be done.

The SNR scalable scheme will be explained below.

FIGS. 19A to 19D are schematic views for explaining the format of a code sequence to be generated and output in the SNR scalable scheme.

FIG. 19A shows the overall format of a code sequence, in which MH is a main header; THi (i=0 to n−1), a tile header; and BSi (i=0 to n−1), a bitstream. The main header MH is comprised of the size (the numbers of pixels in the horizontal and vertical directions) of an image to be encoded, a tile size upon breaking up the image into tiles as a plurality of rectangular regions, the number of components indicating the number of color components, the size of each component, and component information indicating bit precision, as shown in FIG. 19B. In the second embodiment, since an image is not broken up into tiles, the tile size is equal to the image size, and when the image to be encoded is a monochrome multi-valued image, the number of components is "1".

FIG. 19C shows the format of the tile header TH.

The tile header TH consists of a tile length including the bitstream length and header length of the tile of interest, an encoding parameter for the tile of interest, mask information indicating the designated region, and the bit shift amount for coefficients that belong to the designated region. The encoding parameter includes a discrete wavelet transform level, filter type, and the like.

FIG. 19D shows the format of a bitstream in the second embodiment. The bitstream is formed in units of bit planes, which are set in the order from an upper bit plane (bit plane (S-1)) to a lower bit plane (bit plane (0)). In the bit planes, the encoding results of the bit planes of a given quantization index in each subband are sequentially set in units of subbands. In FIG. 19D, S indicates the number of bits required for expressing the maximum quantization index. The code sequence generated in this manner is output to the code output unit 2005.

With this code sequence, hierarchical decoding shown in FIGS. 22A and 22B (to be described later) can be done.

In the second embodiment, the compression ratio of the entire image to be encoded can be controlled by changing the quantization step Δ.

As another method, in this embodiment, lower bits of a bit plane to be encoded by the entropy encoder 2004 can be limited (discarded) in correspondence with a required compression ratio. In this case, not all bit planes are encoded, but bit planes from the most significant bit plane to a bit plane corresponding in number to the required compression ratio are encoded and are included in a final code sequence.

In this manner, by adopting a function of limiting lower bit planes, only bits corresponding to the designated region shown in FIG. 13A are included in large quantity in the code sequence. That is, since the designated region is compressed at a low compression ratio, it can be encoded as a high-quality image.

A method of decoding a bitstream encoded by the aforementioned image encoding apparatus will be explained below.

Figure 20:
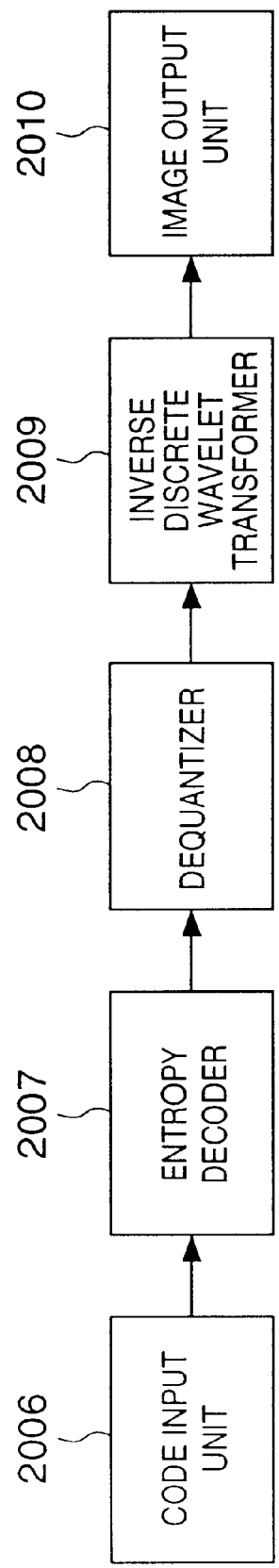
FIG. 20 is a block diagram showing the arrangement of an image decoding apparatus according to the second embodiment.

FIG. 20 is a block diagram showing the arrangement of an image decoding apparatus according to the second embodiment. Reference numeral 2006 denotes a code input unit; 2007, an entropy decoder; 2008, a dequantizer; 2009, an inverse discrete wavelet transformer; and 2010, an image output unit.

The code input unit 2006 receives a code sequence encoded by, e.g., the aforementioned encoding apparatus, analyzes the header included in that sequence to extract parameters required for the subsequent processes, and controls the flow of processes if necessary or outputs required parameters to the subsequent processing units. The bitstreams included in the input code sequence are output to the entropy decoder 2007.

The entropy decoder 2007 decodes and outputs the bitstreams in units of bit planes. Since the decoding sequence at that time is the same as that which has been explained earlier with reference to FIG. 7, a description thereof will be omitted.

The dequantizer 2008 reclaims discrete wavelet transform coefficients from the input, decoded quantization indices by:

$$c' \Delta \times q/2^U; \quad q \neq 0 \quad (13)$$

$$c'=0; \quad q=0 \quad (14)$$

$$U=B; \quad m=1 \quad (15)$$

$$U=0; \quad m=0 \quad (16)$$

where q is the quantization index, and Δ is the quantization step, which is the same value used upon encoding. B is the bit shift amount read out from the tile header, and m is the mask value at the position of the quantization index of interest. c' is the restored transform coefficient, which is obtained by restoring a coefficient s or d in encoding. This transform coefficient c' is output to the inverse discrete wavelet transformer 2009. Since the block diagrams of the arrangement and process of the inverse discrete wavelet transformer 2009 are the same as those in FIGS. 8A and 8B, a description thereof will be omitted.

With the aforementioned process, the original image is reclaimed and is output to the image output unit 2010. Note that the image output unit 2010 may be an image display device such as a monitor or the like, or may be a storage device such as a magnetic disk or the like.

An image encoded by the spatial scalable scheme will be explained below.

The image display pattern upon restoring and displaying an image in the aforementioned sequence will be explained using FIGS. 21A and 21B.

Figure 21A:
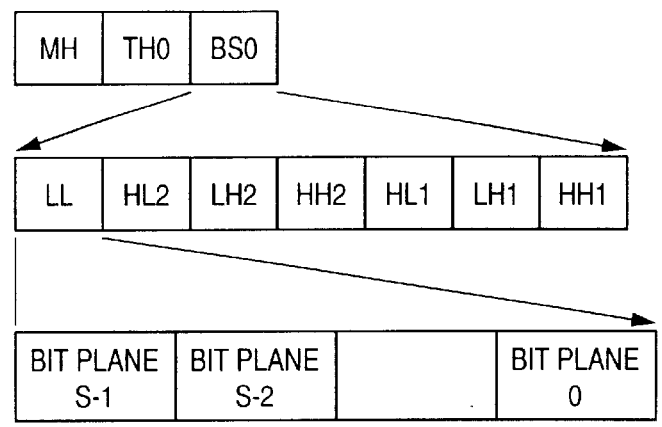
FIGS. 21A and 21B are views for explaining an example of a code sequence in case of spatial scalability according to the second embodiment, subbands upon decoding that code sequence, the sizes of an image to be displayed in correspondence with these subbands, and a change in reproduced image upon decoding the code sequences of the subbands.
Figure 21B:
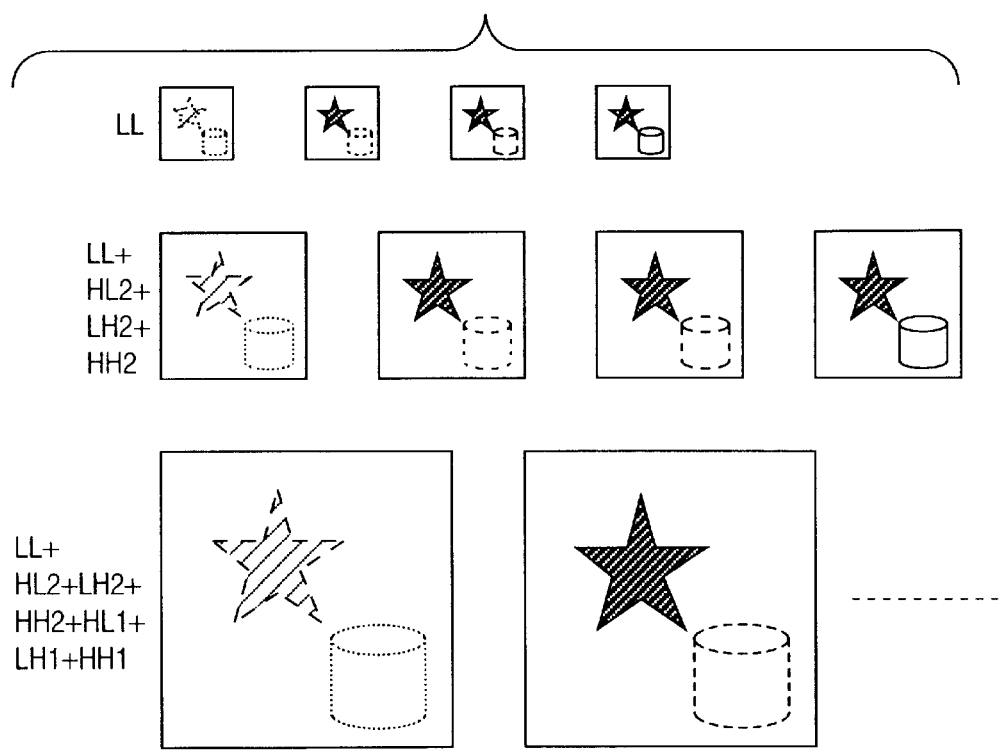

FIG. 21A shows an example of a code sequence, the basic format of which is based on FIGS. 18A to 18D. In this case, the entire image is set as a tile and, hence, the code sequence includes only one tile header (TH0) and bitstream (BS0). In this bitstream (BS0), codes are set in turn from LL as a subband corresponding to the lowest resolution to HH1 in ascending order of resolution, as shown in FIG. 21A. Furthermore, in each subband, codes are set from an upper bit plane (bit plane (S-1)) to a lower bit plane (bit plane 0).

The decoding apparatus sequentially reads this bitstream, and displays an image upon completion of decoding of codes of each bit plane. FIG. 21B shows the respective subbands, the sizes of images to be displayed in correspondence with the subbands, and changes in reproduced image upon decoding a code sequence of each subband. In FIG. 21B, a code sequence corresponding to LL is sequentially read out, and image quality gradually improves along with the progress of the decoding processes of the respective bit planes. At this time, the star-shaped portion used as the designated region upon encoding is restored with high image quality earlier than other portions.

This is because the quantizer 2003 shifts up the quantization indices which belong to the designated region upon encoding, and these quantization indices are decoded at earlier timings than other portions upon bit plane decoding. The same applies to other resolutions, i.e., the designated region portion is decoded with higher image quality.

Furthermore, upon completion of decoding of all the bit planes, the designated region portion and other portions have equal image quality. However, when decoding is interrupted in the middle of the processes, an image with the designated region portion restored to have higher image quality than other regions can be obtained.

Rasterization upon encoding by the SNR scalable scheme will be explained below.

The image display pattern upon restoring and displaying an image in the aforementioned sequence will be explained using FIGS. 22A and 22B.

FIG. 22A shows an example of a code sequence, the basic format of which is based on FIGS. 19A to 19D, but the entire image is set as a tile in this case. Hence, the code sequence includes only one tile header (TH0) and bitstream (BS0). In this bitstream (BS0), codes are set from the most significant bit plane (bit S-1) to the least significant bit plane (bit 0), as shown in FIG. 22A.

The decoding apparatus sequentially reads this bitstream, and displays an image upon completion of decoding of codes of each bit plane. In FIG. 22B, as the decoding processes of the respective bit planes progress in the order of bit (S-1), bit (S-2), . . . , bit 0, the image quality gradually improves. In this case, the star-shaped portion used as the designated region upon encoding is restored with high image quality earlier than other portions.

This is because the quantizer 2003 shifts up the quantization indices which belong to the designated region upon encoding by the encoding apparatus, and these quantization indices are decoded at earlier timings than other portions upon bit plane decoding.

Furthermore, upon completion of decoding of all the bit planes, the designated region portion and other portions have equal image quality. However, when decoding is interrupted in the middle of the processes, an image with the designated region portion restored to have higher image quality than other regions can be obtained.

In the aforementioned second embodiment, when the entropy decoder 2007 limits (ignores) lower bit planes to be decoded, the encoded data to be received or processed is reduced, and the compression ratio can be consequently controlled. In this manner, a decoded image with required image quality can be obtained from only encoded data of the required data volume. When the quantization step Δ upon encoding is "1", and all bit planes are decoded upon decoding, the restored image matches an original image, i.e., reversible encoding and decoding can be realized.

Using the aforementioned function of limiting lower bit planes, since the code sequence to be decoded includes only bits corresponding to the designated region in larger quantity than other regions, as described above using FIG. 14C, the same effect as that upon decoding image data which is obtained by encoding only the designated region at a low compression ratio and as a high-quality image can be consequently obtained.

Characteristic features according to the second embodiment of the present invention will be described below.

FIG. 23 is a block diagram showing the arrangement of an image processing apparatus according to the second embodiment of the present invention.

Referring to FIG. 23, reference numeral 2501 denotes a DWT encoder (encoding unit) which has an arrangement, as shown in, e.g., FIG. 13. The DWT encoder 2501 encodes a newly input image by DWT. Since some images may have already been compressed by other encoding schemes such as DCT and the like, such image is temporarily decoded to a two-dimensional image by a decoding apparatus (not shown) and is input to and encoded by this DWT encoder 2501 again.

The image data encoded by the DWT encoder 2501 is stored in an internal storage unit 2511 via an internal bus 2505 or is stored in an external storage device (not shown) via a network 2506. A list of all images stored in this manner are managed by an image file manager 2502.

If an input image is, e.g., a medical image, it is required to be saved for a long period of time as a proof of diagnosis. Taking an X-ray image as an example, one X-ray image has an image data size of 10 to 20 Mbytes, and around 1,000 such X-ray images are generated per day in a large hospital. Hence, such images cannot be saved without compression. However, it is not appropriate to compress X-ray images immediately after image sensing or those of a patient under treatment at a high compression ratio, since a delicate difference of X-ray images must be observed in progress observation. Hence, an appropriate compression ratio must be determined for each X-ray image to be held, and an image must be compressed and saved at the determined compression ratio.

The image file manager 2502 checks the attributes of managed image files periodically (e.g., everyday or every week). The image files may be managed inside the apparatus via the internal bus 2505 or may be stored and managed in an external storage device (not shown) via the network 2506. Note that the image file manager 2502 may refer to attribute files held in each storage device at a timing at which the attribute information of a given image file is changed or managed. The attributes of the image file include an image type, a sensed portion, the number of days elapsed after the image sensing date, the number of days elapsed after the diagnosis date when that image was referred to, the number of days elapsed after the last access date to that image, a current compression ratio, and the like in addition to patient information.

As the types of such images, X-ray images, CT images, MRI images, and the like are known. Since CT and MRI images normally have a higher density resolution than X-ray images, their compression ratios can be set to be higher than that of X-ray images. Also, sensed portion information is effective as information that pertains to an X-ray image. For example, since a chest image normally contains finer pieces of information than a head image, a high compression ratio can hardly be set for the chest image. The number of days elapsed after the image sensing date and the number of days elapsed after the image diagnosis date can be used as data for determining the compression ratio of a given image on the basis of a legal saving obligation of that image, a guideline for the saving period in the hospital, and the like.

The compression ratio of that image is temporarily determined based on the aforementioned criteria, but the final compression ratio is determined on the basis of the number of days elapsed after the final access date to that image, the outpatient service history of a corresponding patient, and the like. For example, when an image is very old (e.g., an image taken seven years ago), a compression ratio of around 50% which is temporarily determined based on the image sensing date and the like is adopted. However, when a patient corresponding to that image is still visiting the hospital for the same disease, it is finally determined that the compression ratio of that image is suppressed to around 20%.

In this fashion, the image file manager 2502 finally determines the compression ratio of a given image, and compares the determined compression ratio with the current compression ratio of the file. If the compression ratio of the image file must be increased, an image file input unit 2504 fetches that image. Alternatively, when the image is input from an external device, it may be transferred from the external device. At the same time, the finally determined compression ratio is transferred to a compression ratio determination unit 2503, and is instructed to a compression ratio change unit 2507.

The compression ratio change unit 2507 analyzes the input image file, and computes the cut amount of a bitstream to obtain the target compression ratio. A method of deleting an encoded bitstream for an image set with the ROI will be explained below.

If the star-shaped portion in FIG. 14A is designated as the ROI, the ROI is set in units of subbands. This ROI undergoes the bit shift process shown in FIGS. 14B and 14C before encoding. That is, in FIG. 14C, the 3-bit bit shift process is done for the gray ROI.

If bit planes of lower 2 bits are deleted from codes of the non-region-of-interest (non-ROI) shown in FIG. 14C, the codes of the non-ROI can be completely removed in the rightmost block (corresponding to "+3" in FIG. 3). However, in the left and central blocks (respectively corresponding to "+13" and "−6" in FIG. 3), the codes of the non-ROI cannot be completely deleted.

Figure 24:
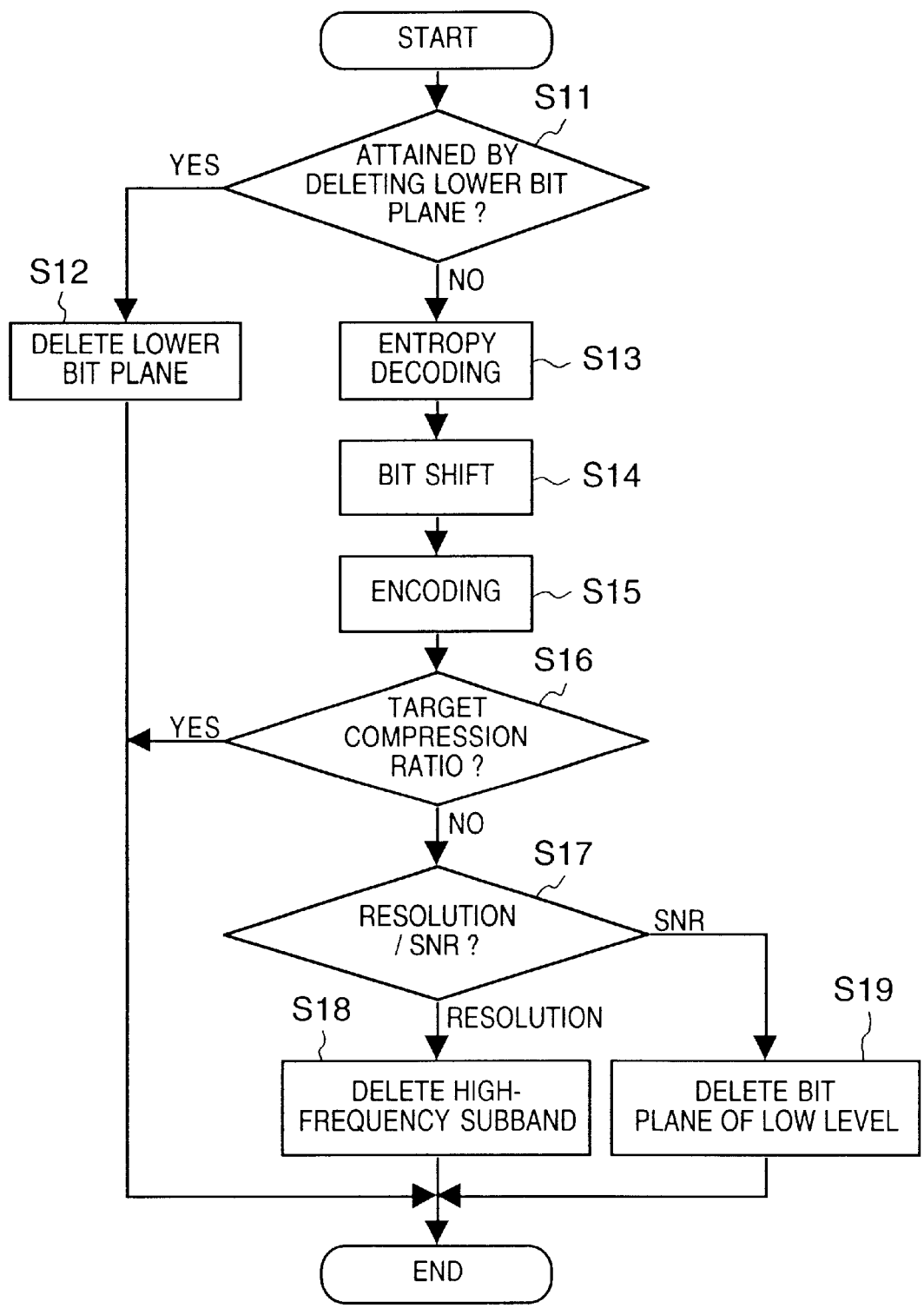
FIG. 24 is a flow chart showing an image compression ratio update process in the image processing apparatus according to the second embodiment of the present invention.

FIG. 24 is a flow chart for explaining how to reach the target compression ratio of image data of the image file in the compression ratio change unit 2507 in FIG. 23.

It is checked in step S11 if the target compression ratio can be reached by deleting only lower bit planes, as was described earlier with reference to FIG. 14C. If YES in step S11, the flow advances to step S12 to delete lower bit planes.

On the other hand, if the target compression ratio cannot be reached by deleting only lower bit planes, the flow advances to step S13. In step S13, the compressed image data is entropy-decoded, and image data of the ROI of the decoded image data undergoes bit shift (step S14).

An explanation will be given based on the example shown in FIG. 14C. In this case, if image data corresponding to the ROI is shifted by 3 bits to shift bit planes by 3 bits, the compression ratio can be higher than the aforementioned case (2-bit shift). In order to obtain the target compression ratio, when the bit shift amount of the ROI becomes larger than that of source image data, this means that the non-ROI of that image data is not encoded at all. The bit-shifted image data is encoded by the encoding apparatus shown in FIG. 13 (step S15). It is checked in step S16 if the target compression ratio can be obtained by deleting lower bit planes from the encoding result after bit shift. If YES in step S16, the flow ends.

However, the target compression ratio cannot often be reached if the non-ROI is not encoded at all. In this case, the flow advances from step S16 to step S17, and a bit plane or subband corresponding to the ROI is deleted in step S18 or S19 to further increase the compression ratio. In this case, a subband to be deleted at that time corresponds to a high-frequency component. Note that data compression in this case can be implemented by deleting a bitstream. Such bitstream deletion method differs depending on the resolution and SNR scalability encoding schemes.

The resolution scalability promptly displays a small image upon transferring and reading out the file, and gradually displays larger images as file transfer and read progress. This example is shown in FIGS. 21A and 21B above.

In this case, since encoding is done in units of subbands, as shown in FIG. 21A, information of a subband HH1 corresponding to the highest frequency range can be deleted in step S18 to increase the compression ratio. Furthermore, when the compression ratio becomes too high if the subband HH1 is deleted, since the subband HH1 is encoded in units of bit planes, information can be deleted in turn from a bit plane of the lowest level.

The method for SNR scalability will be explained below.

In this SNR scalability, an image is encoded so that images with higher SNR are displayed as transfer or read progresses. This example will be explained below taking FIGS. 22A and 22B as an example. Since an image is encoded in units of bit planes in this scheme, as shown in FIG. 22A, the compression ratio can be easily increased by deleting information in units of lower bit planes. In FIG. 22A, bit 0 (Bit 0) has the lowest level. However, in this case as well, when the compression ratio becomes too high if a plane of bit 0 is deleted, information can be deleted in turn from a bit plane *corresponding to a high-frequency subband in the plane of bit 0. Thus, the compression ratio can be easily increased while reducing the computation volume.

In the above description, the bitstream deletion methods for resolution scalability and SNR scalability are limited. However, the present invention is not limited to such specific methods. For example, data may be deleted in the order of bit planes in resolution scalability, or may be deleted in the order of subbands in SNR scalability. However, this method requires more arithmetic operations than the aforementioned methods, and poses a problem especially for a large image.

The image data which has been compressed by the compression ratio change unit 2507 to have a target compression ratio is output from an image file output unit 2508 to the storage unit 2511. When the image data is output onto the network 2506, an external storage device may request to fetch the image.

A DWT decoder 2509 decodes image data compressed by DWT, and the decoded image data is output to and displayed on an image display unit 2510, thus allowing the user to confirm the contents. The DWT decoder 2509 corresponds to the decoding apparatus shown in FIG. 20.

Image display on the image display unit 2510 will be explained below. In an image from which all codes of the non-ROI are deleted by the compression ratio change unit 2507, pixel values to be assigned to the non-ROI are in question. In this case, pixel values that set low luminance or high density are output so as to protect the doctor's eyes from unwanted light as much as possible upon diagnosing using that X-ray image. For example, a portion obtained by removing the ROI 2402 from the irradiated region 2401 in FIG. 15A is originally displayed in black. However, when this image is encoded, since pixel value information is omitted, pixel values that set low luminance or high density are preferably assigned to that portion.

In place of determining the pixel values of the non-ROI by the image display unit 2510, when bitstreams corresponding to the non-ROI are completely deleted, an image file appended with predetermined pixel values of that non-ROI may be created.

As described above, according to the second embodiment, an image processing method and apparatus which can increase the compression ratio of an image by a simple method in association with coding that exploits DWT are provided.

Also, according to the second embodiment, since the compression ratio is increased by preferentially increasing the compression ratio of the non-ROI in image data or deleting codes of the non-ROI, image data can be compressed while preferentially maintaining the image quality of the ROI.

By displaying pixels in the non-ROI in an X-ray image at low luminance or high density, the doctor or the like can easily see the ROI and can accurately diagnose using that X-ray image.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

In the above description, the respective embodiments have been explained independently. However, the present invention is not limited to such specific embodiments, and the arrangement of each embodiment may be combined with that of another embodiment.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:

input means for inputting compressed image data;

compression ratio setting means for setting a compression ratio of the compressed image data input by said input means, in accordance with a time factor; and compression ratio change means for changing the compression ratio of the compressed image data to a compression ratio set by said compression ratio setting means.

2. The apparatus according to claim 1, wherein the image data is at least one sensed image data of an X-ray image, CT image, and MRI image for medical use.

3. The apparatus according to claim 2, wherein said compression ratio setting means further sets the compression ratio on the basis of at least one of a type of image, a sensed portion and an outpatient service history of a patient corresponding to the image data.

4. The apparatus according to claim 2, wherein the time factor includes at least one of the number of days elapsed after an image sensing date, the number of days elapsed after a diagnosis date based on the image, and the number of days elapsed after a last access date to the image.

5. The apparatus according to claim 1, wherein the compressed image data is data compressed by using a wavelet transformation.

6. The apparatus according to claim 1, wherein said compression ratio change means changes the compression ratio of the image data by deleting a bitstream in units of subbands or bit planes of the compressed image data.

7. The apparatus according to claim 4, wherein said compression ratio change means changes the compression ratio of the image data by deleting a subband of a highest frequency range of the compressed image data.

8. The apparatus according to claim 6, wherein said compression ratio change means changes the compression ratio of the image data by deleting a least significant bit plane of the compressed image data.

9. An image processing apparatus, comprising:
input means for inputting an image file including compressed image data; and
compression ratio change means for changing a compression ratio of the image data input by said input means by deleting a code of a non-region-of-interest in the image data,
wherein said compression ratio change means changes the compression ratio of the image data in accordance with a time factor.

10. An image processing apparatus, comprising:
input means for inputting an image file including compressed image data;
first compression ratio change means for changing a compression ratio of the image data input by said input means by deleting a code of a non-region-of-interest in the image data; and
second compression ratio change means for changing the compression ratio of the image data input by said input means by deleting a code of a region of interest in the image data,
wherein the compression ratio changed by said first or second compression ratio change means is determined on the basis of attribute information included in the image file, and when the image data is an X-ray image, the attribute information includes at least one of a type of image, a sensed portion, an outpatient service history of a patient, a number of days elapsed after an image sensing date, a number of days elapsed after a diagnosis date based on the image, and a number of days elapsed after a last access date to the image.

11. The apparatus according to claim 10, wherein said first compression ratio change means deletes data of a lower bit plane of the image data.

12. The apparatus according to claim 10, wherein said second compression ratio change means deletes data of a bit plane of a high-frequency subband when the image data is encoded by a resolution scalable scheme, and deletes data of a bit plane of a lower level when the image data is encoded by an SNR scalable scheme.

13. An image processing apparatus, comprising:
input means for inputting an image file including compressed image data;
first compression ratio change means for changing a compression ratio of the image data input by said input means by deleting a code of a non-region-of-interest in the image data;
second compression ratio change means for changing the compression ratio of the image data input by said input means by deleting a code of a region of interest in the image data;
region of interest extraction means for extracting a region of interest in an input X-ray image;
image transformation means for transforming the X-ray image by using a discrete wavelet transformation;
bit-shift means for bit-shifting up coefficients corresponding to the region of interest among coefficients obtained by said image transformation means; and
compression means for compressing the coefficients bit-shift upped by said bit-shift means and coefficients corresponding to a region other than the region of interest and for generating the compressed image data input by said input means.

14. The apparatus according to claim 13 further comprising:
determination means for determining based on attribute information if the compression ratio is to be changed, wherein said first and second compression ratio change means change the compression ratio on the basis of a determination result of said determination means.

15. The apparatus according to claim 13 further comprising:
a decoder for decoding the image data of the image file; and
output control means for outputting or displaying a pixel value corresponding to the non-region-of-interest of the image data decoded by said decoder at low luminance or high density.

16. An image processing apparatus, comprising:
input means for inputting an image file including compressed image data;
first compression ratio change means for changing a compression ratio of the image data input by said input means by deleting a code of a non-region-of-interest in the image data;
second compression ratio change means for changing the compression ratio of the image data input by said input means by deleting a code of a region of interest in the image data;
region of interest extraction means for extracting a region of interest in an input X-ray image;
image transformation means for transforming the X-ray image by using a discrete wavelet transformation;
bit-shift means for bit-shifting up coefficients corresponding to the region of interest among coefficients obtained by said image transformation means; and
compression means for compressing the coefficients bit-shift upped by said bit-shift means and coefficients corresponding to a region other than the region of interest and for generating the compressed image data input by said input means;
wherein said region of interest extraction means receives an X-ray image, extracts an irradiated region and a through region from the X-ray image, and extracts as the region of interest a region obtained by subtracting the through region from the entire image corresponding to the irradiated region.

17. An image processing method comprising:
an input step, of inputting compressed image data;
a compression ratio setting step, of setting a compression ratio of the compressed image data input in said input step, in accordance with a time factor; and
a compression ratio change step, of changing the compression ratio of the compressed image data to a compression ratio set in said compression ratio setting step.

18. The method according to claim 17, wherein the image data
is at least one sensed image data of an X-ray image, CT image, and MRI image for medical use.

19. The method according to claim 17, wherein the compressed image data is data compressed by using a wavelet transformation.

20. The method according to claim 17, wherein said compression ratio setting step further includes the step of setting the compression ratio on the basis of at least one of a type of image, a sensed portion and an outpatient service history of a patient corresponding to the image data.

21. The method according to claim 17, wherein the time factor includes at least one of the number of days elapsed after an image sensing date, the number of days elapsed after a diagnosis date based on the image, and the number of days elapsed after a last access date to the image.

22. The method according to claim 17, wherein said compression ratio change step includes a step of changing the compression ratio of the image data by deleting a bitstream in units of subbands or bit planes of the compressed image data.

23. The method according to claim 22, wherein said compression ratio change step includes a step of changing the compression ratio of the image data by deleting a subband of a highest frequency range of the compressed image data.

24. The method according to claim 22, wherein said compression ratio change step includes the step of changing the compression ratio of the image data by deleting a least significant bit plane of the compressed image data.

25. An image processing method, comprising:
an input step, of inputting an image file including compressed image data; and
a compression ratio change step, of changing a compression ratio of the image data input in said input step by deleting a code of a non-region-of-interest in the image data,
wherein in said compression ratio change step, the compression ratio of the image data is changed in accordance with a time factor.

26. An image processing method, comprising:
an input step, of inputting an image file including compressed image data;
a first compression ratio change step, of changing a compression ratio of the image data input in said input step by deleting a code of a non-region-of-interest in the image data; and
a second compression ratio change step, of changing the compression ratio of the image data input in said input step by deleting a code of a region of interest in the image data,
wherein the compression ratio changed in said first or second compression ratio change step is determined on the basis of attribute information included in the image file, and when the image data is an X-ray image, the attribute information includes at least one of a type of image, a sensed portion, an outpatient service history of a patient, a number of days elapsed after an image sensing date, a number of days elapsed after a diagnosis date based on the image, and a number of days elapsed after a last access date to the image.

27. The method according to claim 21, further comprising:
a region of interest extraction step, of extracting a region of interest in an input X-ray image;
an image transformation step, of transforming the X-ray image by using a discrete wavelet transformation;
a bit-shift step, of bit-shifting up coefficients corresponding to the region of interest among coefficients obtained in said image transformation step; and
a compression step, of compressing the coefficients bit-shift upped in said bit-shift step and coefficients corresponding to a region other than the region of interest and for generating the compressed image data input in said input step.

28. The method according to claim 27, wherein said region of interest extraction step includes a step of receiving an X-ray image, extracting an irradiated region and a through region from the X-ray image, and extracting as the region of interest a region obtained by subtracting the through region from the entire image corresponding to the irradiated region.

29. A storage medium that stores a program that can be read by a computer, comprising:
an input step module, of inputting compressed image data;
a compression ratio setting step module, of setting a compression ratio of the compressed image data input in said input step module, in accordance with a time factor; and
a compression ratio change step module, of changing the compression ratio of the compressed image data to a compression ratio set by said compression ratio setting step module.

30. The medium according to claim 29, wherein said compression ratio setting step module sets the compression ratio on the basis of at least one of a type of image, a sensed portion and an outpatient service history of a patient corresponding to the image data.

31. The medium according to claim 29, wherein the compressed image data is data compressed by using a wavelet transformation.

32. The medium according to claim 29, wherein the time factor includes at least one of the number of days elapsed after an image sensing date, the number of days elapsed after a diagnosis date based on the image, and the number of days elapsed after a last access date to the image.

33. The medium according to claim 29, wherein said compression ratio change step module changes the compression ratio of the image data by deleting a bitstream in units of subbands or bit planes of the compressed image data.

34. The medium according to claim 33, wherein said compression ratio change step module changes the compression ratio of the image data by deleting a subband of a highest frequency range of the compressed image data.

35. The medium according to claim 33, wherein said compression ratio change step module changes the compression ratio of the image data by deleting a least significant bit plane of the compressed image data.

36. A storage medium that stores a program that can be read by a computer, comprising:
an input step module, of inputting an image file including compressed image data; and
a compression ratio change step module, of changing a compression ratio of the image data input in said input step module by deleting a code of a non-region-of-interest in the image data,
wherein in said compression ratio change step module, the compression ratio of the image data is changed in accordance with a time factor.

37. A storage medium that stores a program that can be read by a computer, comprising:
an input step module, of inputting an image file including compressed image data;
a first compression ratio change step module, of changing a compression ratio of the image data input by said input step module by deleting a code of a non-region-of-interest in the image data; and a second compression ratio change step module, of changing the compression ratio of the image data input by said input step module by deleting a code of a region of interest in the image data, wherein the compression ratio changed by said first or second compression ratio change step module is determined on the basis of attribute information included in the image file, and when the image data is an X-ray image, the attribute information includes at least one of a type of image, a sensed portion, an outpatient service history of a patient, a number of days elapsed after an image sensing date, a number of days elapsed after a diagnosis date based on the image, and a number of days elapsed after a last access date to the image.

38. The medium according to claim 37, wherein said first compression ratio change step module deletes data of a lower bit plane of the image data.

39. The medium according to claim 37, wherein said second compression ratio change step module deletes data of a bit plane of a high-frequency subband when the image data is encoded by a resolution scalable scheme, and deletes data of a bit plane of a lower level when the image data is encoded by an SNR scalable scheme.

40. A storage medium that stores a program that can be read by a computer, comprising:

an input step module, of inputting an image file including compressed image data;

a first compression ratio change step module, of changing a compression ratio of the image data input by said input step module by deleting a code of a non-region-of-interest in the image data;

a second compression ratio change step module, of changing the compression ratio of the image data input by said input step module by deleting a code of a region of interest in the image data;

a region of interest extraction step module, of extracting a region of interest in an input X-ray image;

an image transformation step module, of transforming the X-ray image by using a discrete wavelet transformation;

a bit-shift step module, of bit-shifting up coefficients corresponding to the region of interest among coefficients obtained in said image transformation step module; and a compression step module, of compressing the coefficients bit-shift upped in said bit-shift step module and coefficients corresponding to a region other than the region of interest and for generating the compressed image data input in said input step module.

41. The medium according to claim 40, further comprising:

a determination step module, of determining based on attribute information if the compression ratio is to be changed, wherein said first and second compression ratio change step modules change the compression ratio on the basis of a determination result of said determination step module.

42. The medium according to claim 40, further comprising:

a decoding step module, of decoding the image data of the image file; and an output control step module, of outputting or displaying a pixel value corresponding to the non-region-of-interest of the image data decoded by said decoding step module at low luminance or high density.

* * * * *

UNITED STATES PATENT AND TRADEMARK OFFICE
CERTIFICATE OF CORRECTION

PATENT NO. : 6,792,153 B1
DATED : September 14, 2004
INVENTOR(S) : Tsujii

It is certified that error appears in the above-identified patent and that said Letters Patent is hereby corrected as shown below:

Column 19,
Line 12, "$c'\Delta xq/2^U;$" should read -- $c'=\Delta xq/2^U;$ --.

Column 23,
Line 11, "*corresponding" should read -- corresponding --.

Signed and Sealed this

Twenty-seventh Day of September, 2005

JON W. DUDAS
*Director of the United States Patent and Trademark Office*